(12) United States Patent
Ootaka et al.

(10) Patent No.: US 11,560,121 B2
(45) Date of Patent: Jan. 24, 2023

(54) DISTANCE MEASUREMENT DEVICE AND DISTANCE MEASUREMENT METHOD

(71) Applicants: Kabushiki Kaisha Toshiba, Tokyo (JP); Toshiba Electronic Devices & Storage Corporation, Tokyo (JP)

(72) Inventors: Shoji Ootaka, Yokohama Kanagawa (JP); Tsuneo Suzuki, Kamakura Kanagawa (JP); Hiroshi Yoshida, Yokohama Kanagawa (JP); Masaki Nishikawa, Yokohama Kanagawa (JP); Katsuya Nonin, Kawasaki Kanagawa (JP); Takayuki Kato, Kawasaki Kanagawa (JP); Yoshiharu Nito, Yokohama Kanagawa (JP); Masayoshi Oshiro, Ota Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 343 days.

(21) Appl. No.: 16/811,230

(22) Filed: Mar. 6, 2020

(65) Prior Publication Data
US 2021/0078537 A1 Mar. 18, 2021

(30) Foreign Application Priority Data
Sep. 18, 2019 (JP) .............................. JP2019-169722

(51) Int. Cl.
*B60R 25/30* (2013.01)
*B60R 25/24* (2013.01)
*G01S 13/10* (2006.01)

(52) U.S. Cl.
CPC ............ *B60R 25/30* (2013.01); *B60R 25/248* (2013.01); *G01S 13/103* (2013.01)

(58) Field of Classification Search
CPC ...... B60R 25/30; B60R 25/248; G01S 13/103
See application file for complete search history.

(56) References Cited

U.S. PATENT DOCUMENTS 4,935,744 A * 6/1990 Anflo ...................... G01S 7/288
342/201
5,134,710 A * 7/1992 Åkerberg .............. H04W 88/08
370/347

(Continued)

FOREIGN PATENT DOCUMENTS

EP 3517995 A1 7/2019
JP 2006-042201 A 2/2006

(Continued)

*Primary Examiner* — Nay Tun
(74) *Attorney, Agent, or Firm* — Allen & Overy LLP

(57) ABSTRACT

A first device includes: a first reference signal source; a first transmitting/receiving unit which transmits two or more first carrier signals and receives two or more second carrier signals using an output of the first reference signal source; and a calculating unit. A second device includes: a second reference signal source configured to be operated independently from the first reference signal source; and a second transmitting/receiving unit configured to transmit two or more second carrier signals and receive two or more first carrier signals using an output of the second reference signal source. A frequency group of two or more first carrier signals and a frequency group of two or more second carrier signals differ from each other. The calculating unit calculates a distance between the first device and the second device based on a phase detection result obtained by receiving the first and second carrier signals.

5 Claims, 16 Drawing Sheets

(56) References Cited

U.S. PATENT DOCUMENTS

| | | | |
|---|---|---|---|
| 5,148,148 A * | 9/1992 | Shima | G08B 25/10 340/539.22 |
| 6,477,148 B1 | 11/2002 | Gardenfors et al. | |
| 6,633,550 B1 | 10/2003 | Gardenfors et al. | |
| 7,061,369 B2 * | 6/2006 | Bergerhoff | B60R 25/20 342/127 |
| 7,068,171 B2 | 6/2006 | Gardenfors et al. | |
| 7,149,191 B2 | 12/2006 | Johansson-Gardenfors et al. | |
| 7,209,071 B1 * | 4/2007 | Boring | G01S 13/82 342/51 |
| 7,269,144 B2 | 9/2007 | Gardenfors et al. | |
| 7,346,136 B1 * | 3/2008 | Aiello | H03D 3/007 375/347 |
| 7,580,683 B2 | 8/2009 | Gardenfors et al. | |
| 8,005,439 B2 | 8/2011 | Gardenfors et al. | |
| 8,626,086 B2 | 1/2014 | Gardenfors et al. | |
| 8,644,768 B2 * | 2/2014 | Kluge | G01S 11/02 455/67.14 |
| 8,954,020 B2 | 2/2015 | Gardenfors et al. | |
| 10,002,234 B2 * | 6/2018 | Adler | G16H 20/10 |
| 10,281,984 B1 * | 5/2019 | Amin-Shahidi | G06F 3/016 |
| 10,502,808 B2 | 12/2019 | Nishikawa | |
| 11,275,162 B2 * | 3/2022 | Eggert | G01R 29/0892 |
| 2005/0237953 A1 * | 10/2005 | Carrender | G01S 13/84 370/278 |
| 2008/0048795 A1 * | 2/2008 | Hoshino | H03L 5/00 331/109 |
| 2010/0167662 A1 * | 7/2010 | Kluge | G01S 11/02 455/67.16 |
| 2010/0321245 A1 * | 12/2010 | Aoki | G01S 13/87 455/73 |
| 2012/0213177 A1 * | 8/2012 | Lee | H04L 1/0002 370/329 |
| 2014/0327517 A1 | 11/2014 | Portet | |
| 2015/0139047 A1 | 5/2015 | Gärdenfors et al. | |
| 2015/0211851 A1 * | 7/2015 | Bridges | G01C 3/08 356/5.11 |
| 2018/0267154 A1 | 9/2018 | Ootaka et al. | |
| 2018/0267155 A1 | 9/2018 | Shimizu et al. | |
| 2020/0081088 A1 | 3/2020 | Nishikawa | |
| 2021/0088642 A1 * | 3/2021 | Kato | G01S 13/84 |
| 2021/0356548 A1 | 11/2021 | Nishikawa | |

FOREIGN PATENT DOCUMENTS

| | | |
|---|---|---|
| JP | 2008-122255 A | 5/2008 |
| JP | 2008-178135 A | 7/2008 |
| JP | 4952387 B2 | 6/2012 |
| JP | 2018-155724 A | 10/2018 |
| JP | 2019-128341 A | 8/2019 |

* cited by examiner

DISTANCE MEASUREMENT DEVICE AND DISTANCE MEASUREMENT METHOD

CROSS-REFERENCE TO RELATED APPLICATION

This application is based upon and claims the benefit of priority from the prior Japanese Patent Application No. 2019-169722 filed in Japan on Sep. 18, 2019; the entire contents of which are incorporated herein by reference.

FIELD

Embodiments described herein relate generally to a distance measurement device and a distance measurement method.

BACKGROUND

Recently, a keyless entry system which facilitates locking and unlocking of a vehicle has been adopted by many automobiles. With the use of such a technique, a user of the automobile can lock or unlock a door by making use of communication between a key of the automobile and the automobile. Further, recently, a smart key system has been also popularly used where a user can lock or unlock a door or start an engine without touching a key.

So many incidents, however, have occurred where an attacker who performs a so-called relay attack invades into communication between a key and an automobile, and steals the automobile or articles in a cabin of the automobile. As a countermeasure for preventing such an attack, that is, the so-called relay attack, one countermeasure has been studied where a distance between the key and the automobile is measured, and a control of the vehicle via communication is prohibited when it is determined that the distance is equal to or more than a predetermined distance.

DETAILED DESCRIPTION

Figure 1:
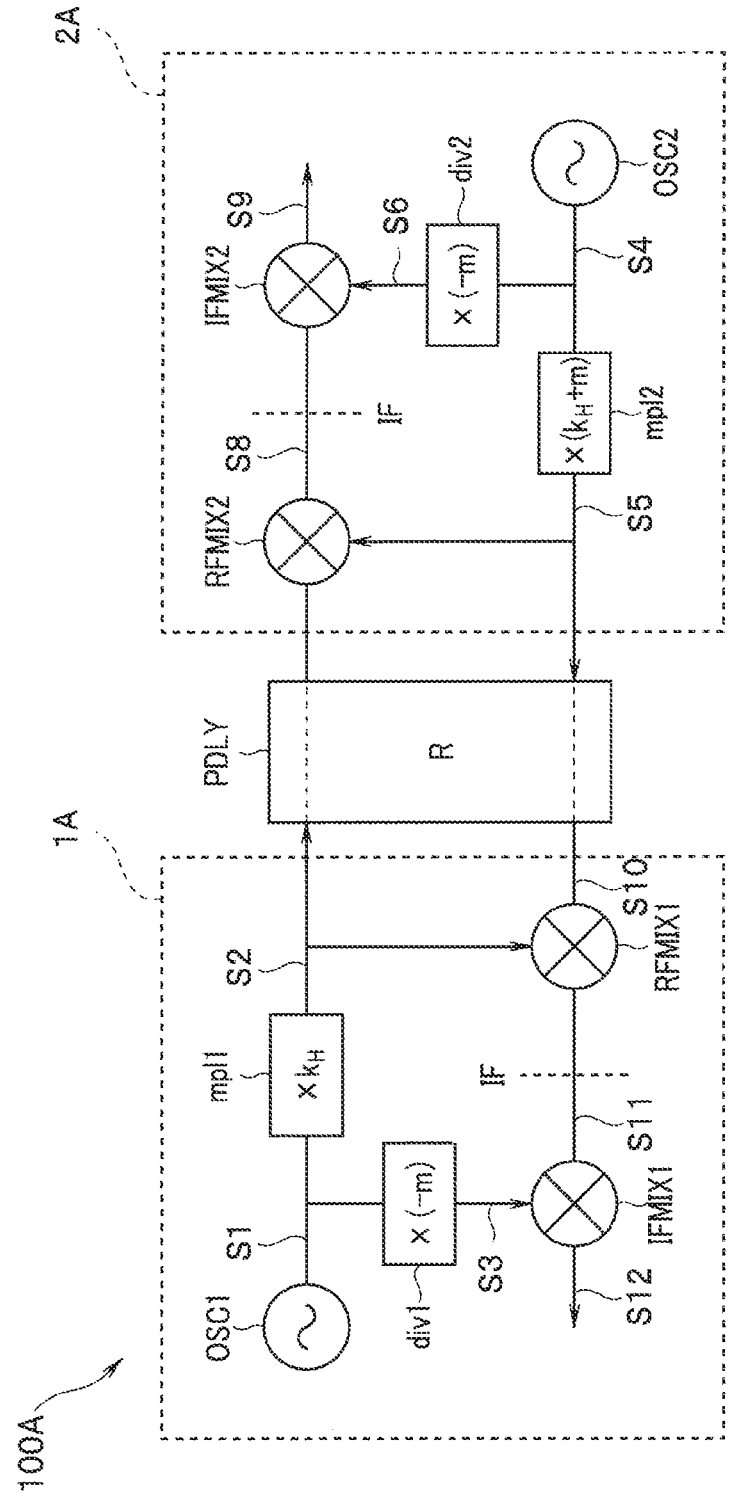
FIG. 1 is a configuration view of a distance measurement system which performs a distance measurement between two devices by a communication type phase detection method.

According to embodiments, a distance measurement device which calculates a distance based on carrier phase detection has a calculating unit configured to calculate a distance between a first device and a second device, at least one of the first device and the second device being movable based on phase information acquired from the first device and the second device. The first device includes: a first reference signal source; and a first transmitting/receiving unit configured to transmit two or more first carrier signals and receive two or more second carrier signals using an output of the first reference signal source. The second device includes: a second reference signal source configured to be operated independently from the first reference signal source; and a second transmitting/receiving unit configured to transmit two or more second carrier signals and receive two or more first carrier signals using an output of the second reference signal source. A frequency group of the two or more first carrier signals and a frequency group of the two or more second carrier signals differ from each other. The calculating unit calculates the distance based on a phase detection result obtained by receiving the first and second carrier signals. The first and second reference signal sources are continuously operated during a period in which the two or more first carrier signals and the two or more second carrier signals are transmitted and received by the first and second transmitting/receiving units.

Hereinafter, the embodiments are described with reference to drawings. According to the respective embodiments described hereinafter, it is possible to provide a distance measurement device and a distance measurement method which realize accurate distance measurement even when the configuration is adopted where a voltage-controlled oscillator (VCO) direct modulation method is used in a transmitting unit and a superheterodyne (SH) method is used in a receiving unit.

First Embodiment (Configuration)

In general, as a distance measurement method, a time of flight detection method, a frequency difference detection method, a phase detection method and the like are provided. From a viewpoint of easiness in mounting, a distance measurement system which adopts a communication type phase detection method where a distance between respective devices is obtained by communication between respective devices has been attracting attentions. The respective devices, however, are operated based on independent reference signals and hence, initial phases of the reference signals differ from each other whereby distance measurement accuracy is largely deteriorated in a communication type phase detection method in general. In view of the above, there has been proposed a technique which enables distance measurement by transmitting phase information detected by one device to the other device. According to the proposed technique, a highly accurate distance can be calculated by applying a predetermined operation using phase information of signals detected by receiving units of two distance measurement devices which form a pair.

On the other hand, the distance measurement device is mounted also on a key side and hence, there is a request for extending a lifetime of a battery of a key whereby lowering of power consumption of the distance measurement device becomes necessary. Most of power consumed by the distance measurement device is consumed by a radio unit and hence, lowering of power consumption of the radio unit is required. Power consumption of the radio unit largely depends on architecture of the radio unit. As the configuration for lowering power consumption, the configuration where a voltage-controlled oscillator (VCO) direct modulation method (hereinafter, also referred to as a VCO direct modulation method) is used in a transmitting unit, and a superheterodyne (SH) method (hereinafter, also referred to as an SH method) or a Low-IF receiving method is used in a receiving unit is well-known. Accordingly, it is desirable to realize a distance measurement device having the configuration where a VCO direct modulation method is used in a transmitting unit and an SH method is used in a receiving unit. In the case, however, where the distance measurement is performed using a VCO direct modulation method in a transmitting unit and an SH method in a receiving unit, accurate distance measurement cannot be performed even when the technique previously proposed is used.

Firstly, the reason is described why the accurate distance measurement cannot be performed by the distance measurement device having the configuration where a voltage-controlled oscillator (VCO) direct modulation method is used in a transmitting unit and a superheterodyne (SH) method is used in a receiving unit even when phase information of signals detected by receiving units of two distance measurement devices which form a pair is used.

FIG. 1 is a configuration view of radio circuits of a distance measurement system which performs a distance measurement between two devices by a communication type phase detection method. The distance measurement system 100A includes a device 1A and a device 2A. At least one of the device 1A and the device 2A is movable. In the distance measurement system 100A, a distance between the device 1A and the device 2A is calculated based on carrier phase detection. Consider a case where one of the device 1A and the device 2A calculates the distance based on phase information acquired from the device 1A and the device 2A.

The device 1A transmits a first distance measurement signal, and the device 2A transmits a second distance measurement signal. The first and second distance measurement signals respectively reach the device 2A and the device 1A via a propagation path PDLY between the device 1A and the device 2A. The device 1A and the device 2A have a radio circuit where a VCO direct modulation method of lowering power consumption is used in a transmitting unit and an SH method of lowering power consumption is used in a receiving unit.

FIG. 1 shows the configuration of a simplified radio unit disposed in the device 1A and the device 2A respectively. The device 1A has an oscillator 1 unique to the device (hereinafter, referred to as OSC1), a frequency multiplier 1 (hereinafter, referred to as mpl1), an RF frequency converter 1 (hereinafter, referred to as RFMIX1), a frequency divider 1 (hereinafter, referred to as div1), and an intermediate (IF) frequency converter 1 (hereinafter, referred to as IFMIX1). The device 2A also has the radio architecture similar to the radio architecture of the device 1A. That is, the device 2A has an oscillator 2 unique to the device (hereinafter, referred to as OSC2), a frequency multiplier 2 (hereinafter, referred to as mpl2), an RF frequency Converter 2 (hereinafter, referred to as RFMIX2), a frequency divider 2 (hereinafter, referred to as div2), and an intermediate (IF) frequency converter 2 (hereinafter, referred to as IFMIX2).

Firstly, consider a case where the device 1A transmits a first distance measurement signal of a single tone wave to the device 2A, and the device 2A receives the first distance measurement signal of the single tone wave transmitted from the device 1A.

An oscillation frequency of the OSC1 which is a reference signal source is $f_{x1}$, and an oscillation frequency of the OSC2 which is a reference signal source is $f_{x2}$. An output signal S1 of the OSC1 is inputted to the mpl1, and an output signal S4 of the OSC2 is inputted to the mpl2.

An output signal S2 of the mpl1 is inputted to the RFMIX1, and the RFMIX1 down-converts the second distance measurement signal received from the device 2A, and outputs an output signal S11 to the IFMIX1. An output signal S3 from the div1 and the output signal S11 from the RFMIX1 are inputted to the IFMIX1, and the IFMIX1 outputs an output signal S12 which is an IQ signal. An output signal S5 of the mpl2 is inputted to the RFMIX2, the RFMIX2 down-converts the first distance measurement signal received from the device 1A, and outputs an output signal S8 to the IFMIX2. A signal S6 from the div2 and the signal S8 from the RFMIX2 are inputted to the IFMIX2, and the IFMIX2 outputs an output signal S9 which is an IQ signal.

The mpl1 multiplies the oscillation frequency $f_{x1}$ of the output signal S1 from the OSC1 by $k_H$ times and, then, the mpl1 supplies the output signal S2 to an antenna, and the first distance measurement signal is transmitted from the device 1A. In such processing, the output signal S1 of the OSCI is expressed by a following equation (1).

$$lo_{x1}=\sin(2\pi f_{x1}t+\theta_{x1}) \tag{1}$$

A phase of the output signal S2 of the mpl1 to which the output signal S1 of the OSCI is inputted is expressed by a following equation (2).

$$\varphi_{tx1}=2\pi k_H f_{x1}t+\theta_{Hx1} \tag{2}$$

In these equations, $\theta_{x1}$ is an initial phase of a reference oscillation signal of the OSC1, and $\theta_{Hx1}$ is an initial phase of the output signal S2 of the mpl1. The output signal S2 of the mpl1 is generated by a phase locked loop (PLL) technique and a voltage-controlled oscillator (VCO) technique in general.

On the other hand, the device 2A receives the first distance measurement signal of an RF frequency signal outputted from the device 1A and hence, the first distance measurement signal is inputted to the RFMIX2 of the device 2A. The output signal S5 of the mpl2 is inputted to the RFMIX2. A frequency of the output signal S5 of the mpl2 is not set to a value which is $k_H$ times as large as the oscillation frequency $f_{x2}$ but set to a value which is $(k_H+m)$ times as large as the oscillation frequency $f_{x2}$. The reason is that a frequency of the signal transmitted from the device 1A is $k_H f_{x1}$, and an intermediate frequency (hereinafter, referred to as IF frequency) is set to a value approximately $(-m)$ times as large as the oscillation frequency $f_{x2}$ after the transmitted signal is converted by the RFMIX2 of the device 2A. In such processing, a phase of the output signal S5 is expressed by a following equation (3).

$$\varphi_{tx2}=2\pi(k_H+m)f_{x2}t+\theta_{Hmx2} \tag{3}$$

In the equation, $\theta_{Hmx2}$ expresses an initial phase of the output signal S5 when the mpl2 sets the frequency of the output signal S5 to $(k_H+m)f_{x2}$. As a local oscillation (LO) signal inputted to the RFMIX2, the output signal S5 of the mpl2 is used. The first distance measurement signal which is a reception signal obtained by frequency conversion by the RFMIX2 is demodulated by a demodulator not shown in the drawing via the IFMIX2, and a phase of the first distance measurement signal is detected. A frequency of the local oscillation (LO) signal for the IFMIX2 inputted to the IFMIX2 is set to a value $(-m)$ times as large as the oscillation frequency of the OSC2, and a phase of the output signal S6 of the div2 is expressed by a following equation (4).

$$\varphi_{b2}=-m2\pi f_{x2}t+\theta_{Bx2} \tag{4}$$

In this equation, $\theta_{Bx2}$ is an initial phase of the local oscillation (LO) signal for the IFMIX2, and the frequency $(-mf_{x2})$ is an IF frequency.

Figure 2:
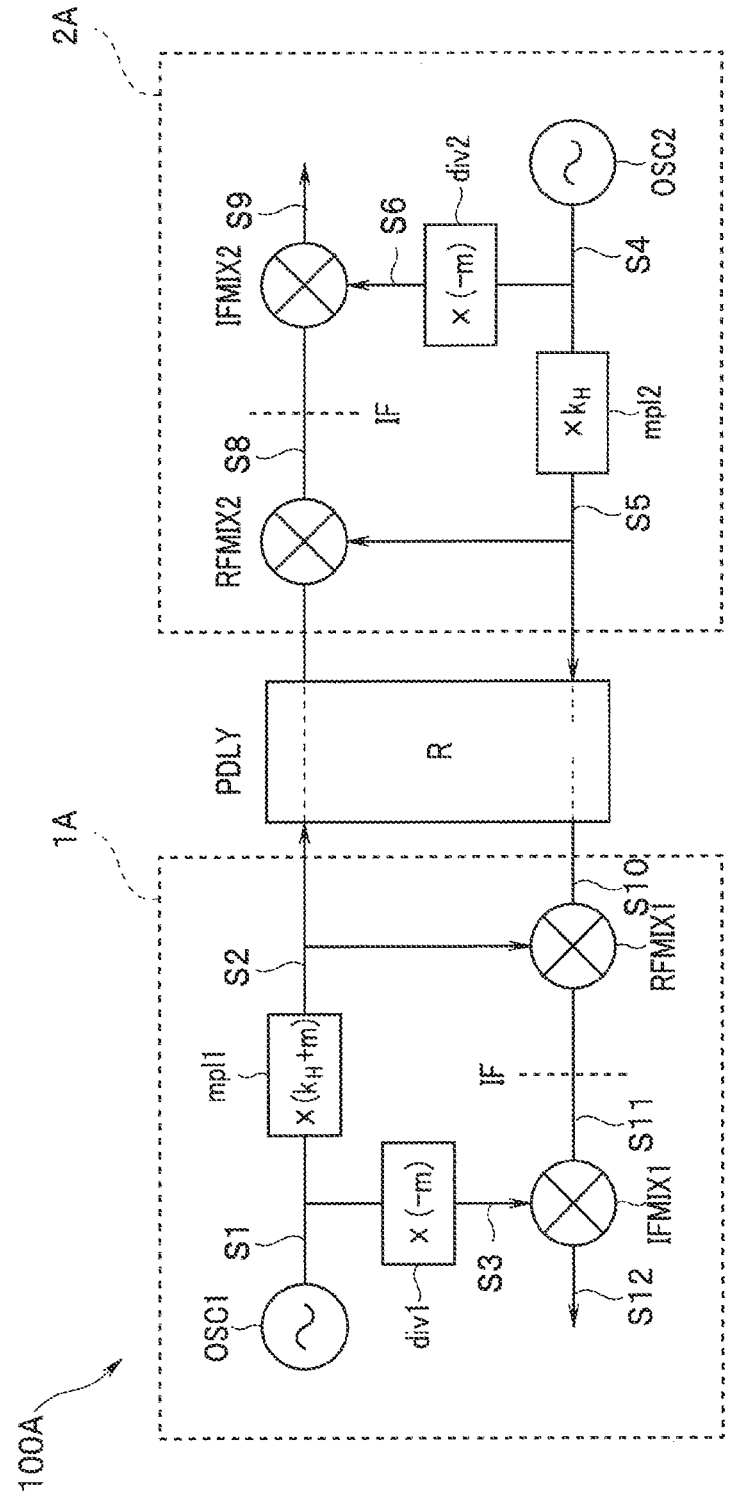
FIG. 2 is a configuration view of radio circuits of the distance measurement system which performs a distance measurement between the two devices by a communication type phase detection method.

Next, a case is described with reference to FIG. 2 where a second distance measurement signal which is a single tone wave is transmitted from the device 2, to the device 1A. FIG. 2 is a configuration view of radio circuits of the distance measurement system which performs a distance measurement between the two devices by a communication type phase detection method. An output signal S4 of an OSC2 which is a reference oscillation signal of the device 2A is expressed by a following equation (5).

$$lo_{x2}=\sin(2\pi f_{x2}t+\theta_{x2}) \tag{5}$$

A phase of an output signal S5 of an mpl2 to which e output signal S4 of the OSC2 is inputted is expressed by a following equation (6).

$$\varphi_{tx2}=2\pi k_H f_{x2}t+\theta_{Hx2} \tag{6}$$

In this equation, $\theta_{x2}$ is an initial phase of a reference oscillation signal of the OSC2, and $\theta_{Hx2}$ is an initial phase of the output signal S5 of the mpl2. The output signal S5 of the mpl2 is generated by a phase locked loop (PLL) technique and a voltage-controlled oscillator (VCO) technique in general.

On the other hand, the device 1A receives the second distance measurement signal which is an RF frequency signal outputted from the device 2A and hence, the second distance measurement signal is inputted to an RFMIX1. An output signal S2 of an mpl1 is also inputted to the RFMIX1. A frequency of the output signal S2 of the mpl1 is not set to a value which is times as large as $f_{x1}$ but set to a value which is $(k_H+m)$ times as large as $f_{x1}$. The reason is that a frequency of the signal transmitted from the device 2A is $k_H f_{x2}$, and an IF frequency is set to approximately $mf_{x1}$ after frequency conversion is performed by the RFMIX1 of the device 1A. In such processing, the output signal S2 is expressed by a following equation (7).

$$\varphi_{tx1}=2\pi(k_H+m)f_{x1}t+\theta_{Hmx1} \tag{7}$$

In this equation, $\theta_{Hmx1}$ expresses an initial phase when the mpl1 sets the frequency of the output signal S2 to $(k_H+m)f_{x1}$. As a local oscillation (LO) signal inputted to the RFMIX1, the output signal S2 of the mpl1 is used. The second distance measurement signal which is a reception signal obtained by frequency conversion by the RFMIX1 is demodulated by a demodulator not shown in the drawing via an IFMIX1, and a phase of the second distance measurement signal is detected. A frequency of an LO signal for the IFMIX1 inputted to the IFMIX1 is set to a value $(-m)$ times as large as the oscillation frequency of the OSC2, and a phase of an output signal S3 of a div1 is expressed by a following equation (8).

$$\varphi_{b1}=-m2\pi f_{x1}t+\theta_{Bx1} \tag{8}$$

In this equation, $\theta_{Bx1}$ is an initial phase of the local oscillation (LO) signal for the IFMIX1, and a frequency $(-mf_{x1})$ is an IF frequency.

Figure 3:
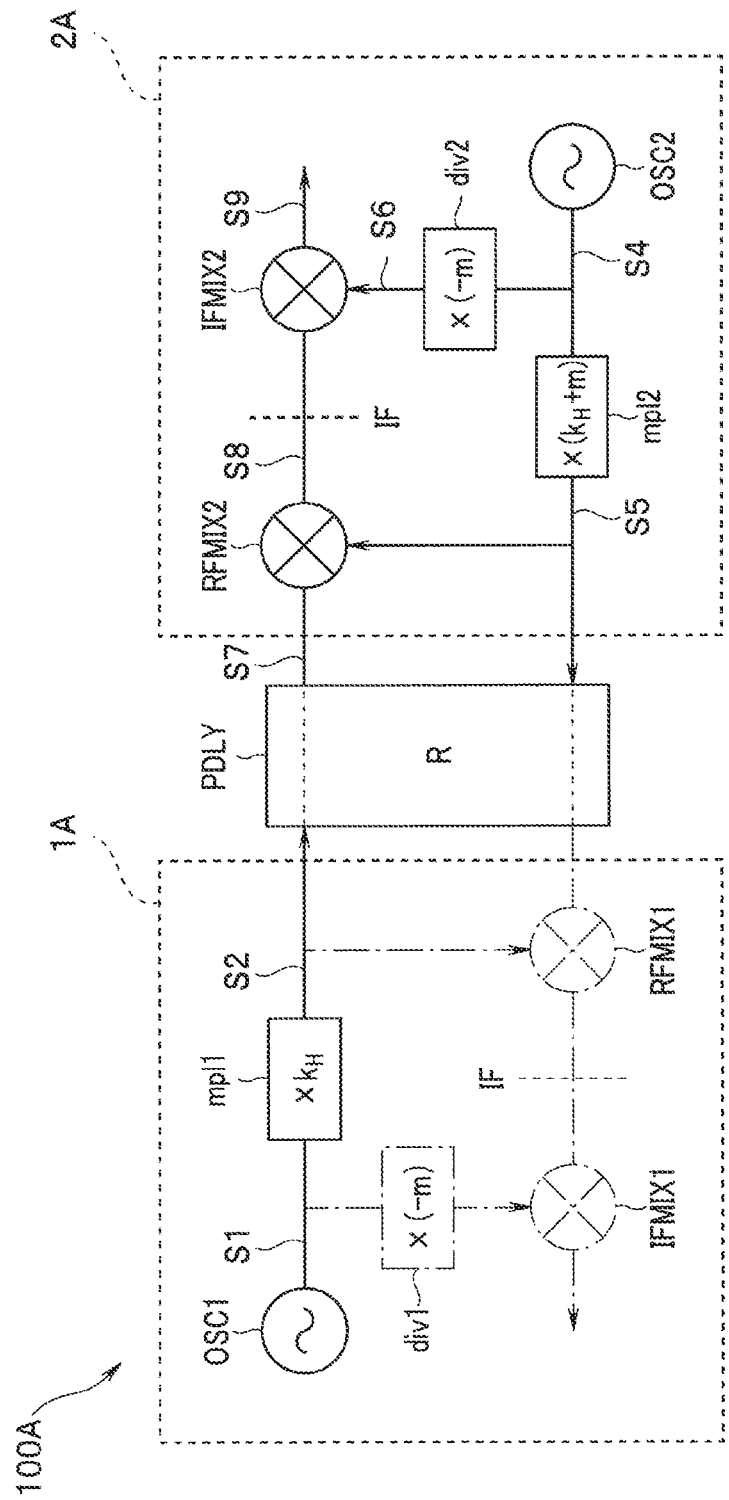
FIG. 3 is a configuration view of the radio circuits of the distance measurement system for describing a phase detected from a distance measurement signal transmitted from one of two devices.

Next, a case is described with reference to FIG. 3 where a first distance measurement signal having a frequency $k_H f_{x1}$ is transmitted from the device 1A, and is received by the device 2A, and phase information of the first distance measurement signal is detected by the device 2A. FIG. 3 is a configuration view of the radio circuits of the distance measurement system for describing a phase detected from a distance measurement signal transmitted from one of two devices. Note that a div1, and an RFMIX1, an IFMIX1 are irrelevant to the above-mentioned operation in FIG. 3 and hence, these components are indicated by a chain line in FIG. 3. A phase of a first distance measurement signal S7 after passing a propagation path PDLY is expressed by a following equation (9).

$$\varphi_{rx2}=2\pi k_H f_{x1}t(t-\tau_R)+\theta_{Hx1} \tag{9}$$

In this equation, $\tau_R$ is a delay time period of the propagation path. The first distance measurement signal S7 is subjected to frequency conversion based on an output signal S5 of an mpl2, and a phase of an output signal S8 of an RFMIX2 is expressed by a following equation (10).

$$\varphi_{ifx2}(t)=2\pi k_H(f_{x1}-f_{x2})t-2\pi m f_{x2}t+(\theta_{Hx1}-\theta_{Hmx2})-2\pi k_H f_{x1}\tau_R \quad (10)$$

Note that this equation expresses a result where only desired signals are extracted. The output signal S8 is subjected to frequency conversion based on an output signal S6 of a div2, and a phase of an output signal S9 of an IFMIX2 detected by the device 2A is expressed by a following equation (11).

$$\varphi_{BB2H}(t)=2\pi k_H(f_{x1}-f_{x2})t+(\theta_{Hx1}-\theta_{Hmx2})-\theta_{Bx2}-2\pi k_H f_{x1}\tau_R \quad (11)$$

Note that this equation expresses a result obtained by desired quadrature demodulation.

Figure 4:
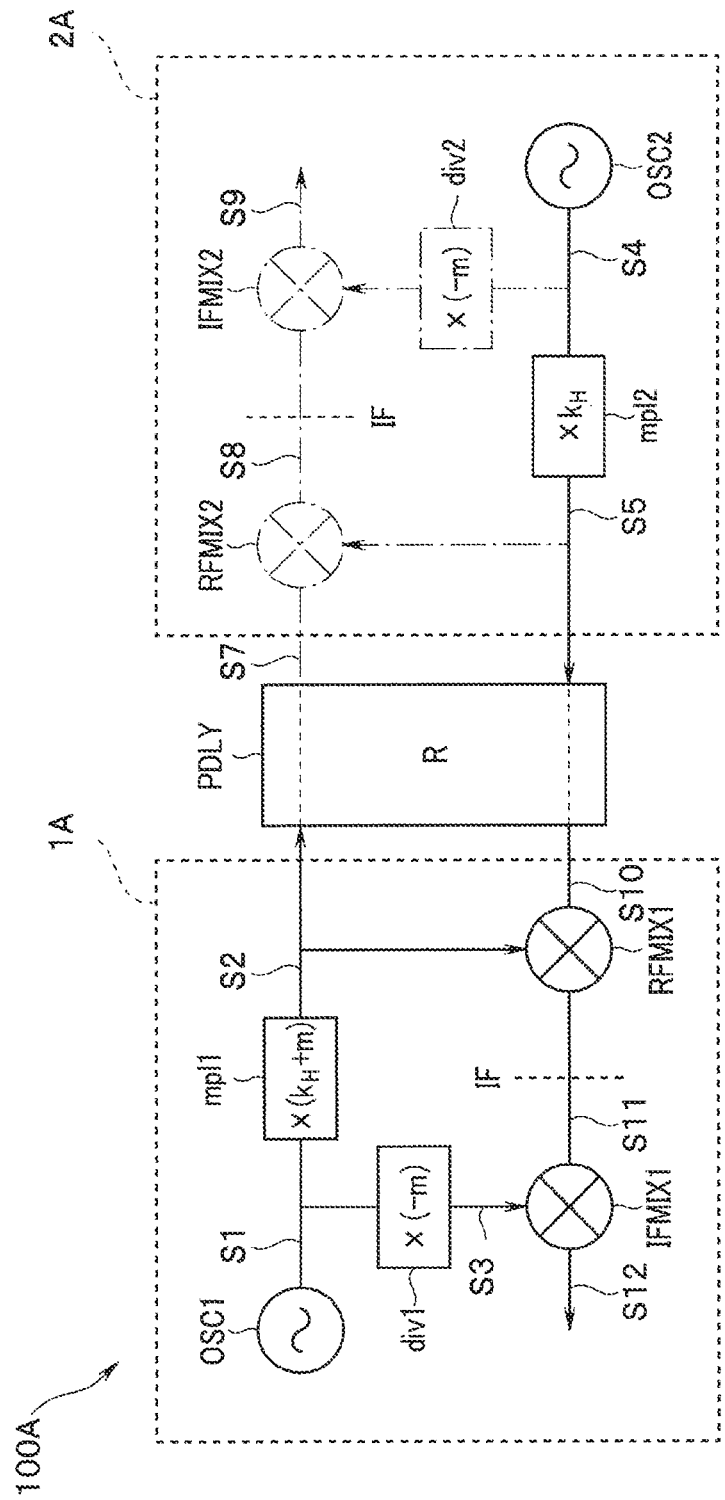
FIG. 4 is a configuration view of the radio circuits of the distance measurement system for describing a phase detected from a distance measurement signal transmitted from the other of the two devices.

Next, a case is described with reference to FIG. 4 where a second distance measurement signal having a frequency $k_H f_{x2}$ is transmitted from the device 2A, and is received by the device 1A, and phase information of the second distance measurement signal is detected by the device 1A. FIG. 4 is a configuration view of the radio circuits of the distance measurement system for describing a phase detected from a distance measurement signal transmitted from the other of the two devices. Note that a div2, an RFMIX2, and an IFMIX2 are irrelevant to the above-mentioned operation in FIG. 4 and hence, these components are indicated by a chain line in FIG. 4. A phase of a second distance measurement signal S10 after passing a propagation path PDLY is expressed by a following equation (12).

$$\varphi_{rx1}=2\pi k_H f_{x2}(t-\tau_R)+\theta_{Hx2} \quad (12)$$

In this equation, $\tau_R$ is a delay time period of the propagation path. The second distance measurement signal S10 is subjected to frequency conversion based on an output signal S2 of an mpl1, and a phase of an output signal S11 of an RFMIX1 is expressed by a following equation (13).

$$\varphi_{ifx1}(t)=2\pi k_H(f_{x2}-f_{x1})t-2\pi m f_{x1}t+(\theta_{Hx2}-\theta_{Hmx1})-2\pi k_H f_{x2}\tau_R \quad (13)$$

Note that this equation expresses a result where only desired signals are extracted. The output signal S11 is subjected to frequency conversion based on an output signal S3 of a div1, and a phase of an output signal S12 of an IFMIX1 detected by the device 1A is expressed by a following equation (14).

$$\varphi_{BB1H}(t)=2\pi k_H(f_{x2}-f_{x1})t+(\theta_{Hx2}-\theta_{Hmx1})-\theta_{Bx1}-2\pi k_H f_{x2}\tau_R \quad (14)$$

Note that this equation expresses a result obtained by desired quadrature demodulation.

A transmission signal from the device 1A and a transmission signal from the device 2A, that is, a first distance measurement signal and a second distance measurement signal estimate the same (substantially the same) frequency in general. Accordingly, a relationship described in a following equation (15) is established.

$$f_{x1}\approx f_{x2} \quad (15)$$

In this equation, ideally or for simplifying the equation, the first distance measurement signal and the second distance measurement signal estimate the same frequency and hence, a relationship described in a following equation (16) is assumed.

$$f_{x1}=f_{x2} \quad (16)$$

In this case, a phase $\varphi_{BB1H}(t)$ of the second distance measurement signal S10 detected by the device 1A and a phase $\varphi_{BB2H}(t)$ of a first distance measurement signal S7 detected by the device 2A are expressed by following equations (17) and (18) respectively.

$$\varphi_{BB1H}(t)=(\theta_{Hx2}-\theta_{Hmx1})-\theta_{Bx1}-2\pi k_H f_{x1}\tau_R \quad (17)$$

$$\varphi_{BB2H}(t)=(\theta_{Hx1}-\theta_{Hmx2})-\theta_{Bx2}-2\pi k_H f_{x1}\tau_R \quad (18)$$

Assuming a distance between the device 1A and the device 2A as R and a velocity of light as c, a following equation (19) is obtained based on a relationship of $\tau_R=R/c$ and the equations (17) and (18).

$$R=-\frac{c(\phi_{BB1H}(t)+\phi_{BB2H}(t))}{4\pi k_H f_{x1}}+ \quad (19)$$
$$\frac{c(\theta_{Hx1}+\theta_{Hx2}-\theta_{Hmx1}-\theta_{Hmx2}-\theta_{Bx1}-\theta_{Bx2})}{4\pi k_H f_{x1}}$$

The first term of the equation (19) is an operation of phases observed by the device 1A and the device 2A and known information. On the other hand, the second term of the equation (19) includes information on initial phases of the mpl1, an mpl2, the div1, and the div2 and hence, the information in the second term is information which cannot be observed. Accordingly, an accurate distance measurement cannot be performed using a phase result detected when the device 1A and the device 2A transmit distance measurement signals having the same frequency, that is, in this case, when distance measurement signals having a frequency reciprocate. This is because an initial phase changes between at the time of transmission and at the time of reception.

Figure 5:
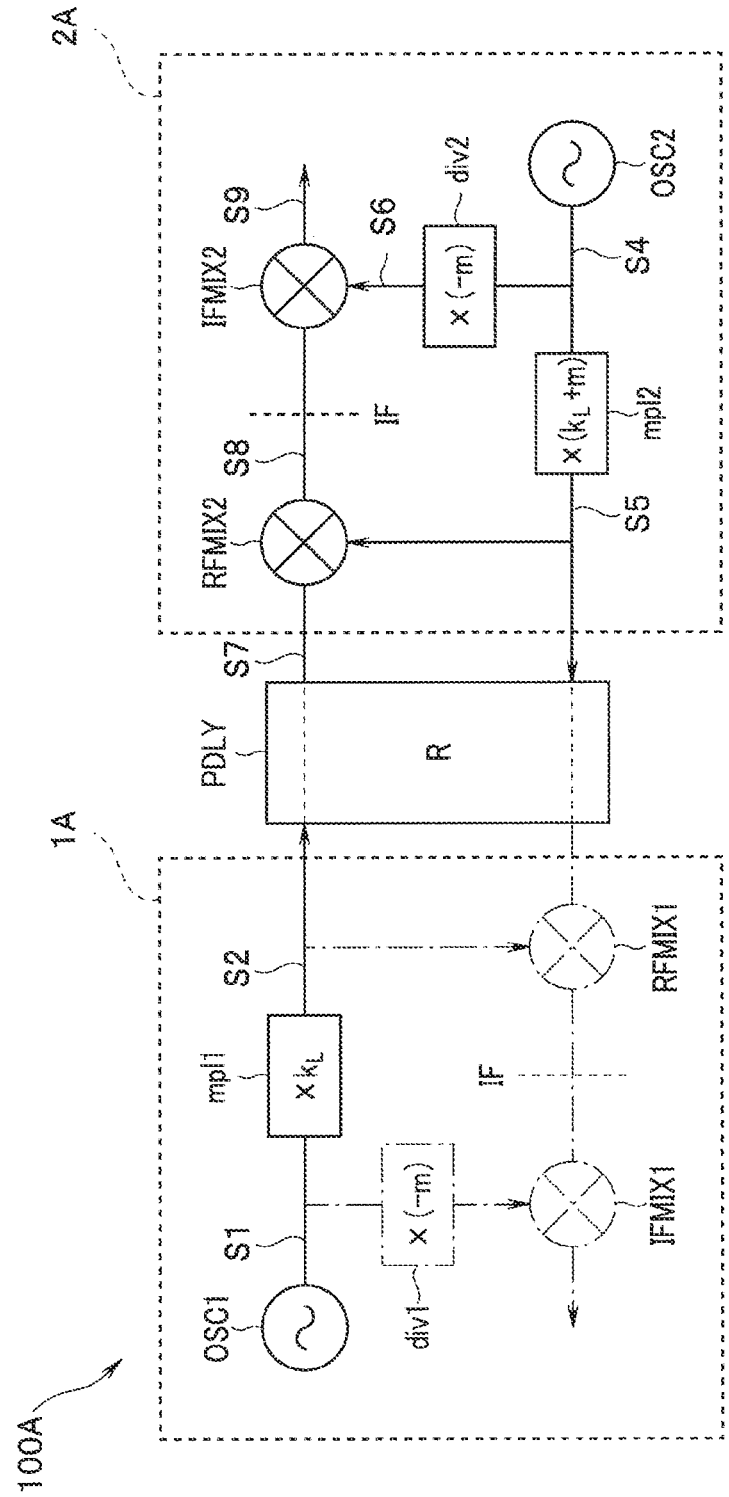
FIG. 5 is a configuration view of the radio circuits of the distance measurement system for describing a phase detected from a distance measurement signal transmitted from one of the two devices while changing a frequency.

Next, by changing a frequency multiplication coefficient $k_H$ in the mpl1 and the mpl2 in FIG. 3 to $k_L$, the frequency of the distance measurement signal can be changed from $k_H f_{x1}$ to $k_L f_{x1}$. In this case, initial phases of the mpl1, mpl2 are also changed by a frequency change. FIG. 5 is a configuration view of the radio circuits of the distance measurement system for describing a phase detected from a distance measurement signal transmitted from one of the two devices by changing a frequency. FIG. 5 is a view showing a case where a first distance measurement signal is transmitted from the device 1A to the device 2A. A phase of an output signal S2 of an mpl1 and a phase of an output signal S5 of an mpl2 are expressed by following equations (20) and (21) respectively.

$$\varphi_{tx1}=2\pi k_L f_{x1}t+\theta_{Lx1} \quad (20)$$

$$\varphi_{tx2}=2\pi(k_L+m)f_{x2}t+\theta_{Lmx2} \quad (21)$$

Figure 6:
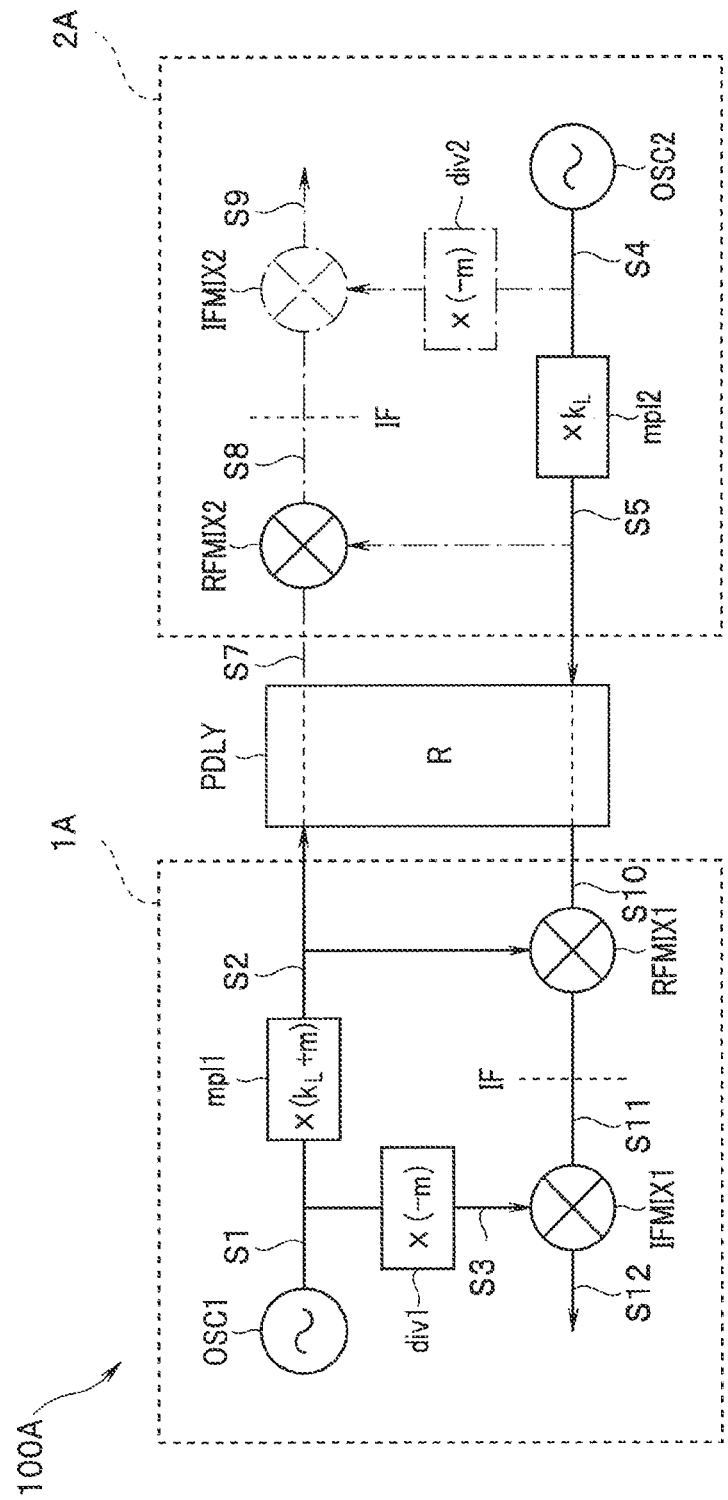
FIG. 6 is a configuration view of the radio circuits of the distance measurement system for describing a phase detected from a distance measurement signal transmitted from the other of the two devices while changing a frequency.

In the same manner, a frequency of a first distance measurement signal can be changed from $k_H f_{x1}$ to $k_L f_{x1}$ by changing the frequency multiplication coefficient $k_H$ of the mpl1 and the mpl2 shown in FIG. 4 to $k_L$. In this case, initial phases of the mpl1 and the mpl2 are also changed by a frequency change. FIG. 6 is a configuration view of the radio circuits of the distance measurement system for describing a phase detected from a distance measurement signal transmitted from the other of the two devices by changing a frequency. FIG. 6 is a view showing a case where a distance measurement signal is transmitted from the device 2A to the device 1A, and a phase of an output signal S2 and a phase of an output signal S5 are expressed by following equations (22) and (23) respectively.

$$\varphi_{tx1}=2\pi(k_L+m)f_{x1}t+\theta_{Lmx1} \quad (22)$$

$$\varphi_{tx2}=2\pi k_L f_{x2}t+\theta_{Lx2} \quad (23)$$

For simplifying the equations, as expressed by the equation (16), an analysis is made by assuming $f_{x1}=f_{x2}$. In the case where a frequency of a distance measurement signal is $k_L f_{x1}$, to obtain a phase $\varphi_{BB1L}(t)$ of a second distance measurement signal S10 detected by the device 1A and a phase $\varphi_{BB2L}(t)$ of a first distance measurement signal S7 detected by the device 2A, the phase $\varphi_{BB1L}(t)$ and the phase $\varphi_{BB2L}(t)$ are expressed by following equations (24) and (25) respectively.

$$\varphi_{BB1L}(t)=(\theta_{Lx2}-\theta_{Lmx1})-\theta_{Bx1}-2\pi k_L f_{x1}\tau_R \quad (24)$$

$$\varphi_{BB2L}(t)=(\theta_{Lx1}-\theta_{Lmx2})-\theta_{Bx2}-2\pi k_L f_{x1}\tau_R \quad (25)$$

A following equation (26) is obtained from the equation (17), the equation (18), the equation (24), and the equation (25).

$$R = -\frac{c(\phi_{BB1H}(t)+\phi_{BB2H}(t)-\phi_{BB1L}(t)-\phi_{BB2L}(t))}{4\pi(k_H-k_L)f_{x1}} + \frac{c(\theta_{Hx1}+\theta_{Hx2}-\theta_{Hmx1}-\theta_{Hmx2}-\theta_{Lx1}-\theta_{Lx2}+\theta_{Lmx1}+\theta_{Lmx2})}{4\pi(k_H-k_L)f_{x1}} \quad (26)$$

Accordingly, even when two distance measurement signals having the frequency $k_H f_{x1}$ and the frequency $k_L f_{x1}$ reciprocate, accurate distance measurement cannot be performed using the detected phase information. This is because, as described above, an initial phase at the time of transmission and an initial phase at the time of reception change between the device 1A and the device 2A. Even when frequencies are changed, two kinds of phase information are acquired, and a differential between two kinds of phase information is obtained, the change of the initial phase between at the time of transmission and at the time of reception cannot be canceled.

Next, a distance measurement system for realizing accurate distance measurement according to this embodiment is described. The distance measurement system has the configuration where a VCO direct modulation method is used in a transmitting unit and an SH method is used in a receiving unit.

Figure 7:
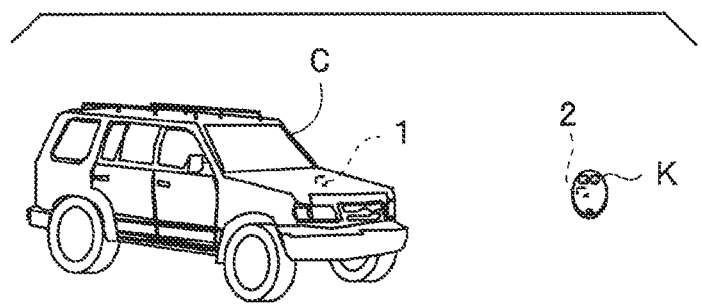
FIG. 7 is a configuration view for describing a smart key system to which a distance measurement system according to a first embodiment is applied.

FIG. 7 is a configuration view for describing a smart key system to which the distance measurement system according to this embodiment is applied. The distance measurement system 100 includes a device 1 and a device 2. At least one of the device 1 and the device 2 is movable. In the distance measurement system 100, a distance between the device 1 and the device 2 is calculated based on a carrier phase detection. At least one of the device 1 and the device 2 has a calculating unit which calculates the distance between the device 1 and the device 2 based on phase information acquired by the device 1 and the device 2.

A smart key system for locking and unlocking an automobile C is formed of the automobile C and a key K for locking and unlocking a door of the automobile C and for starting an engine. More specifically, the smart key system performs radio communication between the device 1 mounted on the automobile C and the device 2 incorporated in the key K in accordance with a predetermined protocol, and locking of the door or the like becomes possible when the key K is duly authenticated at the automobile.

Figure 8:
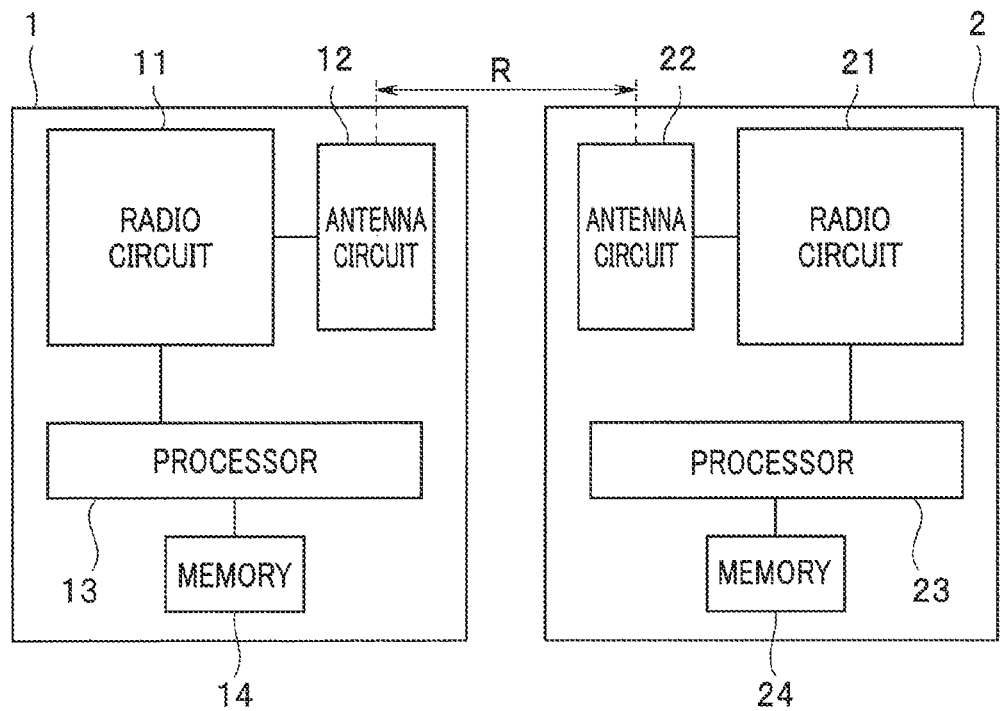
FIG. 8 is a block diagram showing the configuration of two devices according to the first embodiment.

FIG. 8 is a block diagram showing the configuration of the device 1 and the device 2. The device 1 and the device 2 are spaced apart from each other by a distance R. The distance R corresponds to, for example, a distance between a user of the automobile C holding the key K and the automobile C.

The device 1 includes a radio circuit 11, an antenna circuit 12, a processor 13, and a memory 14. In the same manner, the device 2 includes a radio circuit 21, an antenna circuit 22, a processor 23, and a memory 24.

The radio circuits 11 and 21 each include a circuit configured to transmit and receive various radio signals such as a beacon signal described later. The radio circuits 11 and 21 each also include a circuit configured to transmit and receive a distance measurement signal. The configuration of the circuit for distance measurement is described later.

The antenna circuits 12 and 22 each include one or more antennas. The antenna circuits 12 and 22 can transmit transmission waves corresponding to transmission signals from the radio circuits 11 and 21 respectively. Further, the antenna circuits 12 and 22 are respectively configured such that the antenna circuits 12 and 22 receive transmission waves from the antenna circuits 22 and 12, and supply reception signals to the radio circuits 11 and 21.

The processors 13 and 23 control the radio circuits 11 and 21 respectively. The processors 13 and 23 are respectively configured to realize predetermined functions by reading and executing software stored in the memories 14 and 24 using a central processing unit (CPU). Note that the processors 13 and 23 may be respectively formed of an electronic circuit including a semiconductor device.

The processor 13 of the device 1 controls the radio circuit 11 so as to allow the radio circuit 11 to transmit a beacon signal at a predetermined cycle. When the processor 23 of the device 2 receives the beacon signal via the radio circuit 21, the processor 23 controls the radio circuit 21 such that the radio circuit 21 transmits a predetermined signal and performs communication between the devices 1 and 2. Authentication is performed in such communication. When the authentication is performed, the processor 13 of the device 1 notifies the authentication to a control device not shown in the drawing of the automobile C. As a result, the door can be unlocked and the engine can be also started.

In this embodiment, as a countermeasure against a relay attack, the distance R between the devices 1 and 2 is measured. Accordingly, even when such authentication is performed, the door or the like of the automobile C can be controlled such that unlocking of the door or the like cannot be performed unless the distance R is less than a predetermined distance value. In other words, when the distance R between the automobile C and the key K is measured after the above-mentioned authentication and it is determined that the distance R is equal to or more than the predetermined distance value, the control device of the automobile C can perform processing of prohibiting unlocking or the like of the door so as to prevent unlocking or the like of the door in the automobile C.

Phase information detected by one of the device 1 and the device 2 is transmitted to the other of the device 1 and the device 2, and the distance R is calculated by the other device. In this case, the device 1 of the automobile C calculates the distance R using phase information detected by the device 1 and phase information received from the device 2. Accordingly, the processor 13 of the device 1 has a calculating unit configured to calculate the distance R. When the distance R is equal to or more than a predetermined value, the control device of the automobile C performs processing of prohibiting unlocking or the like of the door for preventing unlocking or the like of the door in the automobile C.

A transmitting unit of a transmitting/receiving unit of each of the device 1 and the device 2 has the configuration which directly modulates an output signal of a voltage-controlled oscillator (VCO), and a receiving unit of the transmitting/ receiving unit of each of the device 1 and the device 2 has the configuration adopting a heterodyne method or a Low-IF method.

The devices 1 and 2 have reference signals independent from each other. In this embodiment, in the measurement of the distance between the device 1 and the device 2, it is advantageous from a viewpoint of low power consumption that the radio unit adopts the architecture configuration where each of the devices 1 and 2 uses a VCO direct modulation method in the transmitting unit and uses an SH method in the receiving unit. In such a configuration, a first distance measurement signal is transmitted from the device 1 to the device 2, a second distance measurement signal is transmitted from the device 2 to the device 1, and a distance R is measured based on phase information detected by the device 1 and the device 2. Assume a plurality of distance measurement signals transmitted from the device 1 to the device 2 as a first carrier group, and assume a plurality of distance measurement signals transmitted from the device 2 to the device 1 as a second carrier group. The reason the term "carrier group" is used is that two or more waves are used. An effect of the carrier group is described later, and in an example describe hereinafter, the description is made with respect to a case where the carrier group is formed of two waves for facilitating the understanding of the invention. Further, also described later, it is not always necessary that a distance measurement signal of a predetermined frequency included in the first carrier group and a distance measurement signal of a predetermined frequency included in the second carrier group simultaneously exist, and the distance measurement signals may be transmitted or received one wave by one wave time-sequentially between the device 1 and the device 2. In this embodiment, however, a mode is described where time-sequential handling of signals is not considered.

The distance measurement system 100 includes the device 1 and the device 2. The device 1 transmits a first distance measurement signal, and the device 2 transmits a second distance measurement signal. The first and second distance measurement signals reach the device 2 and the device 1 via a propagation path PDLY between the device 1 and the device 2. The device 1 and the device 2 respectively have the radio circuit where a VCO direct modulation method of low power consumption is used in the transmitting unit, and an SH method of low power consumption is used in the receiving unit.

Next, the configuration of the radio circuits in the devices 1 and 2 is described. Note that, in FIG. 9 and the like which are used for the description made hereinafter, only the radio circuit relating to distance measurement is shown, and only processing relating to distance measurement is described. The device 1 is mounted in the automobile C, and the device 2 is incorporated in the key K.

Figure 9:
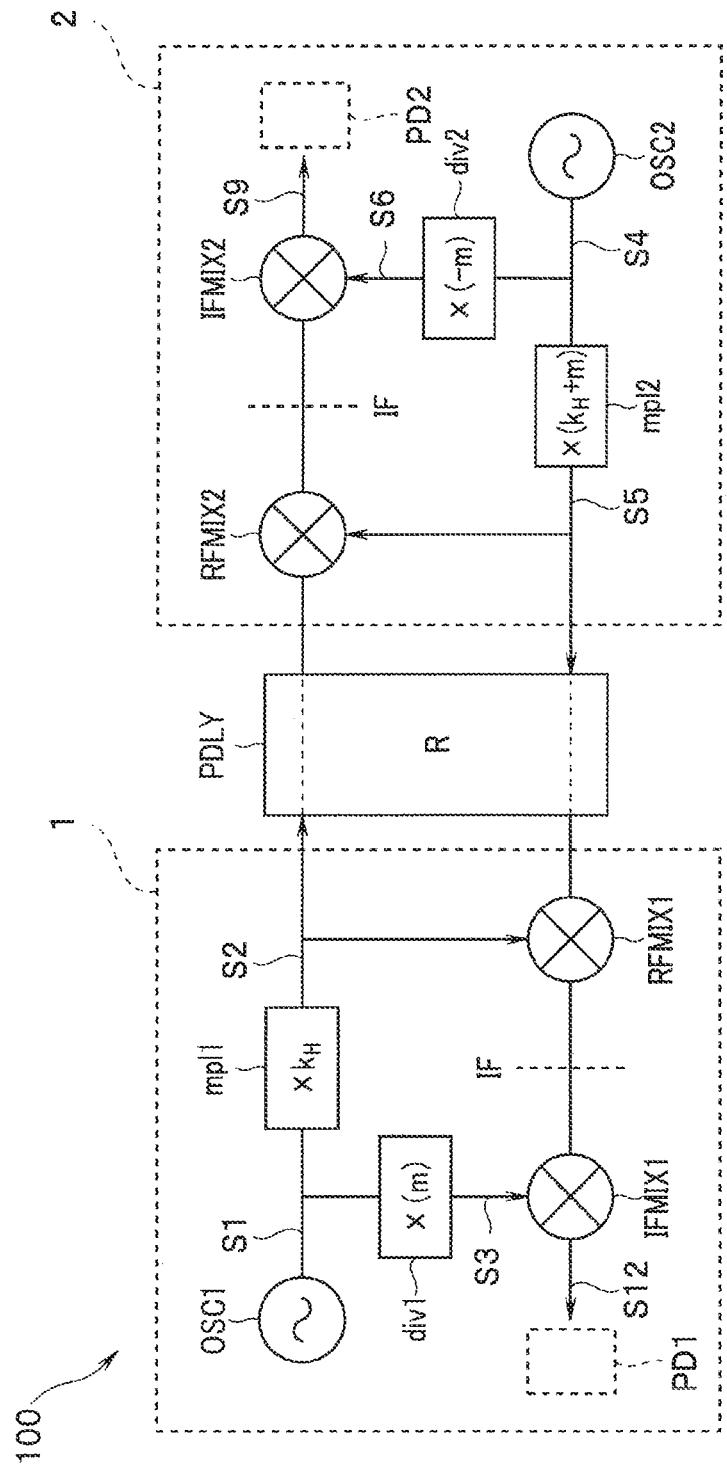
FIG. 9 is a configuration view of a radio circuit of the distance measurement system which performs a distance measurement between the two devices according to the first embodiment.

FIG. 9 is a configuration view of the radio circuits of the distance measurement system which performs a distance measurement between the two devices according to this embodiment. The circuits shown in FIG. 9 and succeeding drawings have substantially the same circuit configuration as the circuits shown in FIG. 1 to FIG. 6 and hence, the same symbols are given to identical components.

FIG. 9 shows the configuration of the simplified radio circuits of the device 1 and the device 2. The device 1 has an OSC1 which is an oscillator unique to the device, an mpl1 which is a frequency multiplier, an RFMIX1 which is an RF frequency converter, a div1 which is a frequency divider, and an IFMIX1 which is an IF frequency converter.

The device 2 also has the radio architecture similar to the radio architecture of the device 1. In other words, the device 2 has an OSC2 which is an oscillator unique to the device, an mpl2 which is a frequency multiplier, an RFMIX2 which is an RF frequency converter, a div2 which is a frequency divider, and an IFMIX2 which is an IF frequency converter.

The mpl1, the RFMIX1, the div 1, and the IFMIX1 form the transmitting/receiving unit of the device 1. The transmitting/receiving unit of the device 1 transmits two or more (two in this embodiment) first carrier signals and receives two or more (two in this embodiment) second carrier signals from the device 2 using an output of the OSC1. The mpl2, the RFMIX2, the div2, and the IFMIX2 form the transmitting/receiving unit of the device 2. The transmitting/receiving unit of the device 2 transmits two or more (two in this embodiment) second carrier signals and receives two or more (two in this embodiment) first carrier signals from the device 1 using an output of the OSC2. The frequency group of two or more first carrier signals and the frequency group of two or more second carrier signals differ from each other.

The transmitting/receiving unit of the device 1 includes a phase detector PD1 configured to detect a phase of a second carrier signal, and the transmitting/receiving unit of the device 2 includes a phase detector PD2 configured to detect a phase of a first carrier signal.

The OSC1 is a reference signal source of the device 1, and the OSC2 is a reference signal source of the device 2. The OSC2 is independently operated from the OSC1. The OSC1 and the OSC2 are continuously operated during a period in which first and second carrier signals are transmitted and received by the respective transmitting/receiving units of the device 1 and the device 2.

When the device 1 transmits a first distance measurement signal of one single tone wave of a first carrier group to the device 2, the mpl1 multiplies an oscillation frequency $f_{x1}$ of the OSC1 by $k_H$ times, and transmits the first distance measurement signal to the device 2. In this embodiment, an output signal S1 of the OSC1 is expressed by the following equation (1) which is also described above.

$$lo_{x1} = \sin(2\pi f_{x1} t + \theta_{x1}) \quad (1)$$

A phase of an output signal S2 of the mpl1 is expressed by the following equation (2) which is also described above.

$$\varphi_{tx1} = 2\pi k_H f_{x1} t + \theta_{Hx1} \quad (2)$$

In these equations, $\theta_{x1}$ is an initial phase of a reference oscillation signal of the OSC1, and $\theta_{Hx1}$ is an initial phase of the output signal S2 of the mpl1. The output signal S2 of the mpl1 is generated by a phase locked loop (PLL) technique and a voltage-controlled oscillator (VCO) technique in general.

As a local oscillation (LO) signal inputted to the RFMIX1, an output signal S2 of the mpl1 is used. An output signal S12 obtained by frequency conversion by the RFMIX1 is converted into an IQ signal by the IFMIX1, and the IQ signal is demodulated by a demodulator not shown in the drawing, and a phase of the IQ signal is detected. A frequency of a local oscillation (LO) signal for the IFMIX1 inputted to the IFMIX1 is set to a value m times as large as the oscillation frequency of the OSC1, and a phase of an output signal S3 of the div1 is expressed by a following equation (27).

$$\varphi_{h1} = m 2\pi f_{x1} t + \theta_{Bx1} \quad (27)$$

In this equation, $\theta_{Bx1}$ is an initial phase of the local oscillation (LO) signal for the IFMIX1, and frequency $mf_{x1}$ is an IF frequency.

Next, a case is described where the device 2 transmits a second distance measurement signal of one single tone wave of a second carrier group to the device 1. An output signal S4 of a reference signal OSC2 of the device 2 is expressed by the following equation (5) which is also described above.

$$lo_{x2} = \sin(2\pi f_{x2} t + \theta_{x2}) \quad (5)$$

A phase of an output signal S5 of the mpl2 is expressed by a following equation (28).

$$\varphi_{tx2} = 2\pi(k_H + m) f_{x2} t + \theta_{Hmx2} \quad (28)$$

In the equation, $\theta_{x2}$ is an initial phase of an oscillation signal of the OSC2, $(k_H+m)$ is a frequency multiplication coefficient of the mpl2, and $\theta_{Hmx2}$ is an initial phase of the output signal S5 of the mpl2. The output signal S5 of the mpl2 is generated by a phase locked loop (PLL) technique and a voltage-controlled oscillator (VCO) technique in general.

As a local oscillation (LO) signal inputted to the RFMIX2, the output signal S5 of the mpl2 is used. An output signal which is a reception signal obtained by frequency conversion by the RFMIX2 is converted into an IQ signal by the IFMIX2, and the IQ signal is demodulated by a demodulator not shown in the drawing, and a phase of the IQ signal is detected. A frequency of an LO signal for the IFMIX2 inputted to the IFMIX2 is set to a value (−m) times as large as the oscillation frequency of the OSC2, and a phase of an output signal S6 of the div1 is expressed by the following equation (4) which is also described above.

$$\varphi_{b2} = -m 2\pi f_{x2} t + \theta_{Bx2} \quad (4)$$

In the equation, $\theta_{Bx2}$ is an initial phase of the local oscillation (LO) signal for the IFMIX2, and the frequency $(-mf_{x2})$ is an IF frequency. Note that although irregularities in manufacture and variations in temperature exist between the device 1 and the device 2, it is assumed that these irregularities are small and hence, an equation $f_{x1} \approx f_{x2}$ is assumed as the previously described equation (15) expresses.

Consider a case where one wave of a first carrier group is transmitted from the device 1 to the device 2 and one wave of a second carrier group is transmitted from the device 2 to the device 1 without changing the above-mentioned setting of the respective radio circuits. In other words, by operating the distance measurement system without updating initial phases of the mpl1, the mpl2 which become distance measurement errors when transmitting and returning of a distance measurement signal between the device 1 and the device 2 is performed without changing setting of the respective radio circuits, distance measurement errors can be corrected as described hereinafter. In this case, a frequency of the one wave of the first carrier group transmitted from the device 1 to the device 2 is $k_H f_{x1}$, and a frequency of the one wave of the second carrier group returned from the device 2 to the device 1 is $(k_H+m) f_{x2}$.

Figure 10:
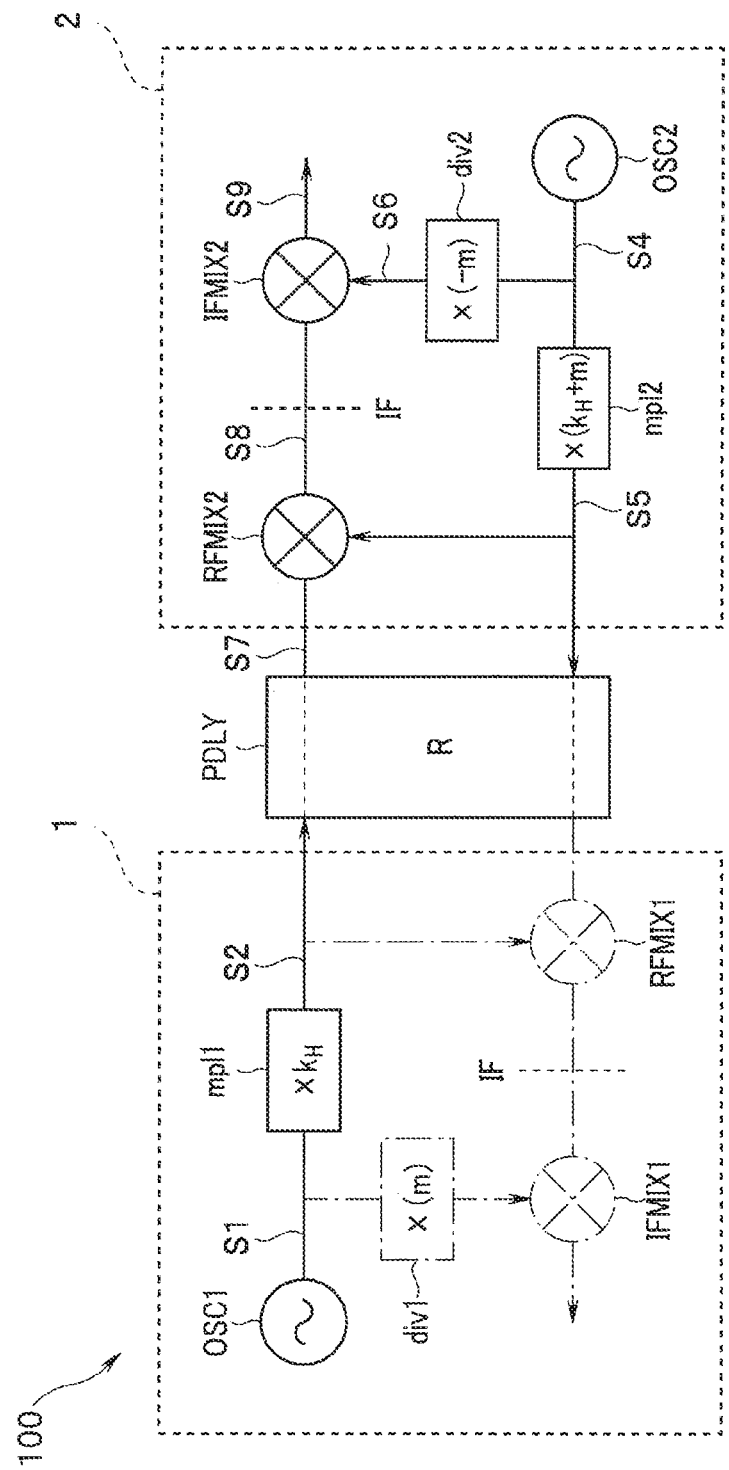
FIG. 10 is a configuration view of the radio circuits of the distance measurement system for describing the flow of signal processing where one wave in a first carrier group is transmitted from one of the two devices to the other of the two devices, and a phase of the one wave is detected by the other of the two devices according to the first embodiment.

FIG. 10 is a configuration view of the radio circuits of the distance measurement system for describing the flow of signal processing where one wave in a first carrier group is transmitted from the device 1 to the device 2, and a phase of one wave is detected by the device 2. The div1, the RFMIX1, and the IFMIX1 are irrelevant to the above-mentioned operation in FIG. 10 and hence, these components are indicated by a chain line in FIG. 10. A phase of a first distance measurement signal S7 after passing a propagation path PDLY is expressed by the following equation (9) which is also described above.

$$\varphi_{rx2} = 2\pi k_H f_{x1}(t - \tau_R) + \theta_{Hx1} \quad (9)$$

In this equation, $\tau_R$ is a delay time period of the propagation path. The first distance measurement signal S7 is subjected to frequency conversion based on an output signal S5 of the mpl2, and a phase of an output signal S8 of the RFMIX2 is expressed by the following equation (10) which is also described above.

$$\varphi_{ifx2}(t) = 2\pi k_H (f_{x1} - f_{x2}) t - 2\pi m f_{x2} t + (\theta_{Hx1} - \theta_{Hmx2}) - 2\pi k_H f_{x1} \tau_R \quad (10)$$

Note that this equation expresses a result where only desired signals are extracted. The output signal S8 is subjected to frequency conversion based on the output signal S6 of the div2, and a phase of an output signal (IQ signal) S9 of the IFMIX2 detected by the device 2 is expressed by the following equation (11) which is also described above.

$$\varphi_{BB2H}(t) = 2\pi k_H (f_{x1} - f_{x2}) t + (\theta_{Hx1} - \theta_{Hmx2}) - \theta_{Bx2} - 2\pi k_H f_{x1} \tau_R \quad (11)$$

Note that this equation expresses a result obtained by desired quadrature demodulation.

Figure 11:
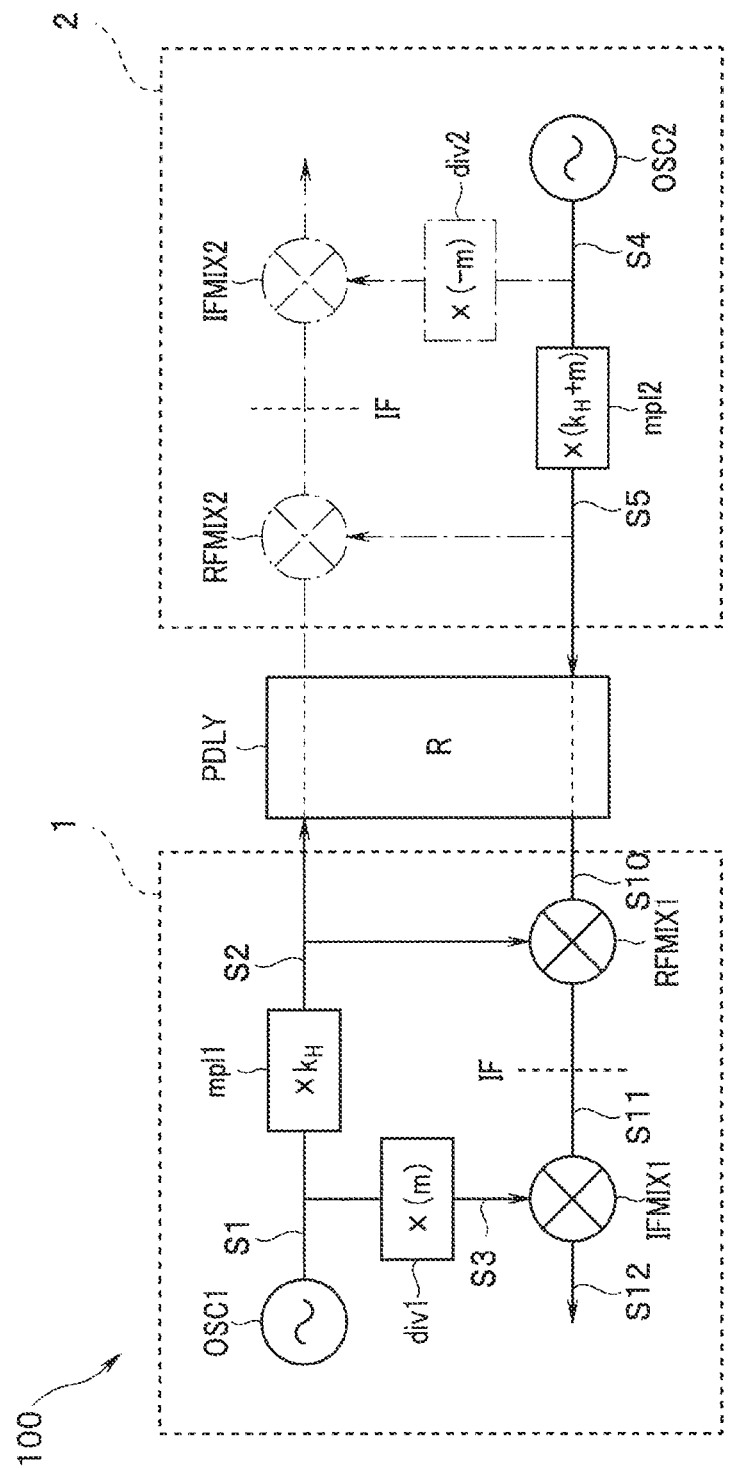
FIG. 11 is a configuration view of the radio circuits of the distance measurement system for describing the flow of signal processing where one wave in a second carrier group is transmitted from the other of the two devices to the one of the two devices, and a phase of the one wave is detected by the one of the two devices according to the first embodiment.

Next, a case is described with reference to FIG. 11 where a distance measurement signal of frequency $(k_H + m) f_{x2}$ which is the one wave of the second carrier group is transmitted from the device 2, and is received by the device 1, and phase information of the distance measurement signal is detected by the device 1. FIG. 11 is a configuration view of the radio circuits of the distance measurement system for describing the flow of signal processing where one wave in the second carrier group is transmitted from the device 2 to the device 1, and a phase of the one wave is detected by the device 1. Note that the div2, the RFMIX2, and the IFMIX2 are irrelevant to the above-mentioned operation in FIG. 11 and hence, these components are indicated by a chain line in FIG. 11. In FIG. 11, however, a phase of a local oscillation signal in each radio circuit is not changed front a state shown in FIG. 10. A phase of a second distance measurement signal S10 after passing the propagation path PDLY is expressed by a following equation (29).

$$\varphi_{rx1} = 2\pi(k_H + m) f_{x2}(t - \tau_R) + \theta_{Hmx2} \quad (29)$$

In this equation, $\tau_R$ is a delay time period of the propagation path. The second distance measurement signal S10 is subjected to frequency conversion based on the output signal S2 of the mpl1, and a phase of an output signal S11 of the RFMIX1 is expressed by a following equation (30).

$$\varphi_{ifx1}(t) = 2\pi k_H (f_{x2} - f_{x1}) t + 2\pi m f_{x2} t + (\theta_{Hmx2} - \theta_{Hx1}) - 2\pi (k_H + m) f_{x2} \tau_R \quad (30)$$

Note that this equation expresses a result where only desired signals are extracted. The output signal S11 is subjected to frequency conversion based on an output signal S3 of the div1, and a phase of an output signal S12 (IQ signal) of the IFMIX1 detected by the device 1 is expressed by a following equation (31).

$$\varphi_{BB1H}(t) = 2\pi(k_H + m)(f_{x2} - f_{x1}) t + (\theta_{Hmx2} - \theta_{Hx1}) - \theta_{Bx1} - 2\pi (k_H + m) f_{x2} \tau_R \quad (31)$$

Note that this equation expresses a result obtained by desired quadrature demodulation. A following equation (32) is obtained by adding the equation (11) and the equation (31) to each other.

$$\varphi_{BB1H}(t) + \varphi_{BB2H}(t) = -(\theta_{Bx1} + \theta_{Bx2}) - 2\pi k_H (f_{x1} + f_{x2}) \tau_R + 2\pi m (f_{x2} - f_{x1}) t - 2\pi m f_{x2} \tau_R \quad (32)$$

A first term of a right side of the equation (32) expresses initial phases of the div1 and the div2, and these phases included in the first term are independent from each other and are also difficult to be detected. Further, a term of a product of an IF frequency difference and a time period which is a third term of the right side is also difficult to be detected. Accordingly, phases have uncertainty in the equation (32) and hence, accurate distance calculation cannot be performed using the equation (32) as it is.

Figure 12:
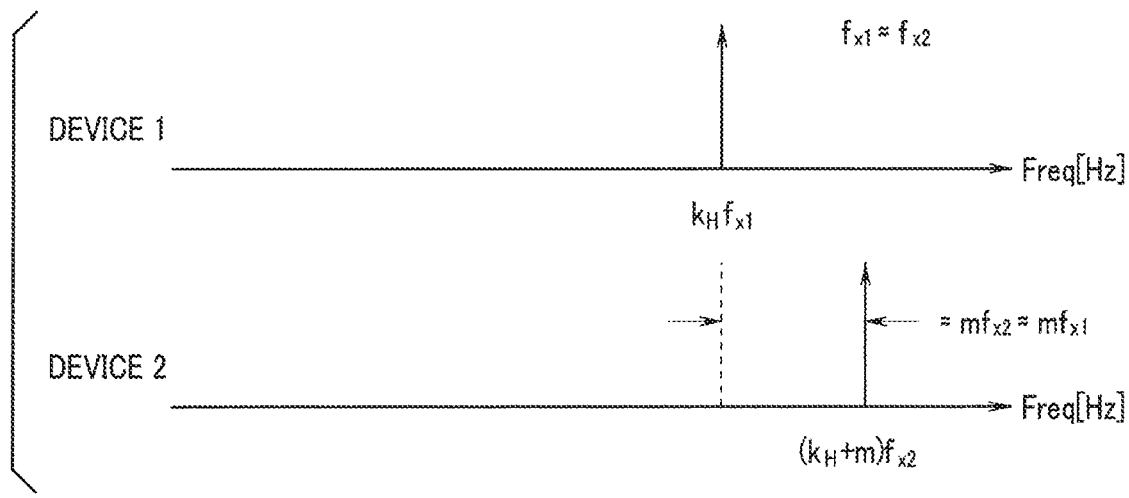
FIG. 12 is a view showing a frequency relationship between distance measurement signals transmitted from the two devices described in FIG. 10 and FIG. 11.

FIG. 12 is a view showing a frequency relationship between distance measurement signals transmitted from the device 1 and the device 2 described in FIG. 10 and FIG. 11.

Next, a case is considered where the device 1 and the device 2 transmit distance measurement signals of frequencies $k_H f_{x1}$ and $(k_H+m)f_{x2}$ respectively and, thereafter, the device 1 and the device 2 transmit distance measurement signals of frequencies $k_L f_{x1}$ and $(k_L+m)f_{x2}$ which are different from the frequencies $k_H f_{x1}$ and $(k_H+m)f_{x2}$ respectively.

Figure 13:
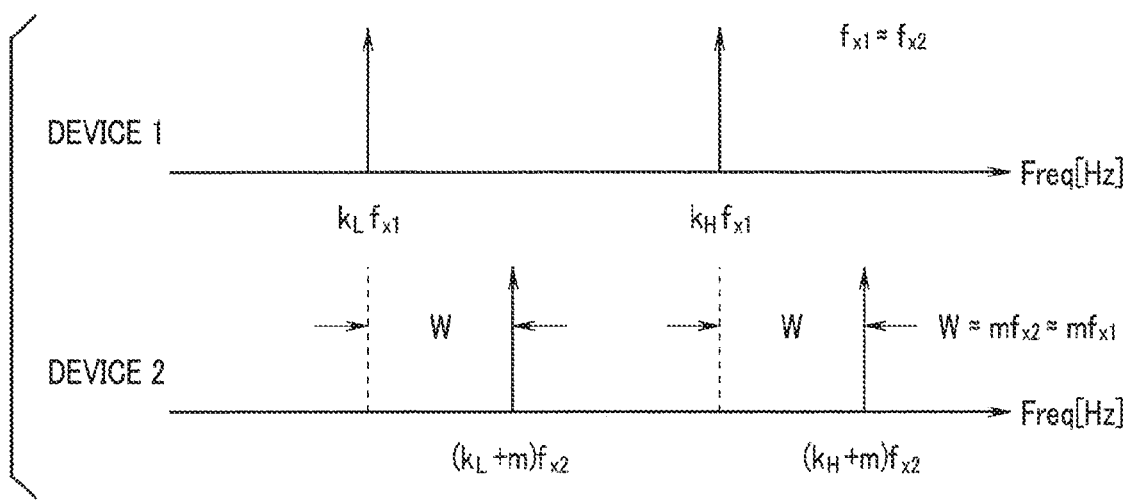
FIG. 13 is a view showing a frequency relationship among four distance measurement signals transmitted from the two devices according to the first embodiment.

FIG. 13 is a view showing a frequency relationship among four distance measurement signals transmitted from the device 1 and the device 2 described hereinafter. As can be understood from FIG. 13, two waves having a frequency difference W which is a frequency interval between two waves shown in FIG. 12 are added, the frequency difference is $(k_H-k_L)f_{x1}$, and $(k_H-k_L)f_{x2}$ in the device 1 and the device 2 respectively, and these frequency differences become substantially equal frequency difference W from the condition expressed in the equation (15). When the distance measurement signals of frequencies added in the device 1 and the device 2 are transmitted, $k_H$ in FIG. 10 and FIG. 11 is changed to $k_L$, and $\theta_{Hx1}$ is changed to $\theta_{Lx1}$, and $\theta_{Hmx2}$ is changed to $\theta_{Lmx2}$ along with the change from $k_H$ to $k_L$. It is assumed, however, that operations of the OSC1 and the OSC2 are not stopped during a period where the distance measurement signals of four waves shown in FIG. 13 are transmitted and received and hence, there is no change between phases of the output signals S3 and S6 of the div1 and the div2.

Figure 14:
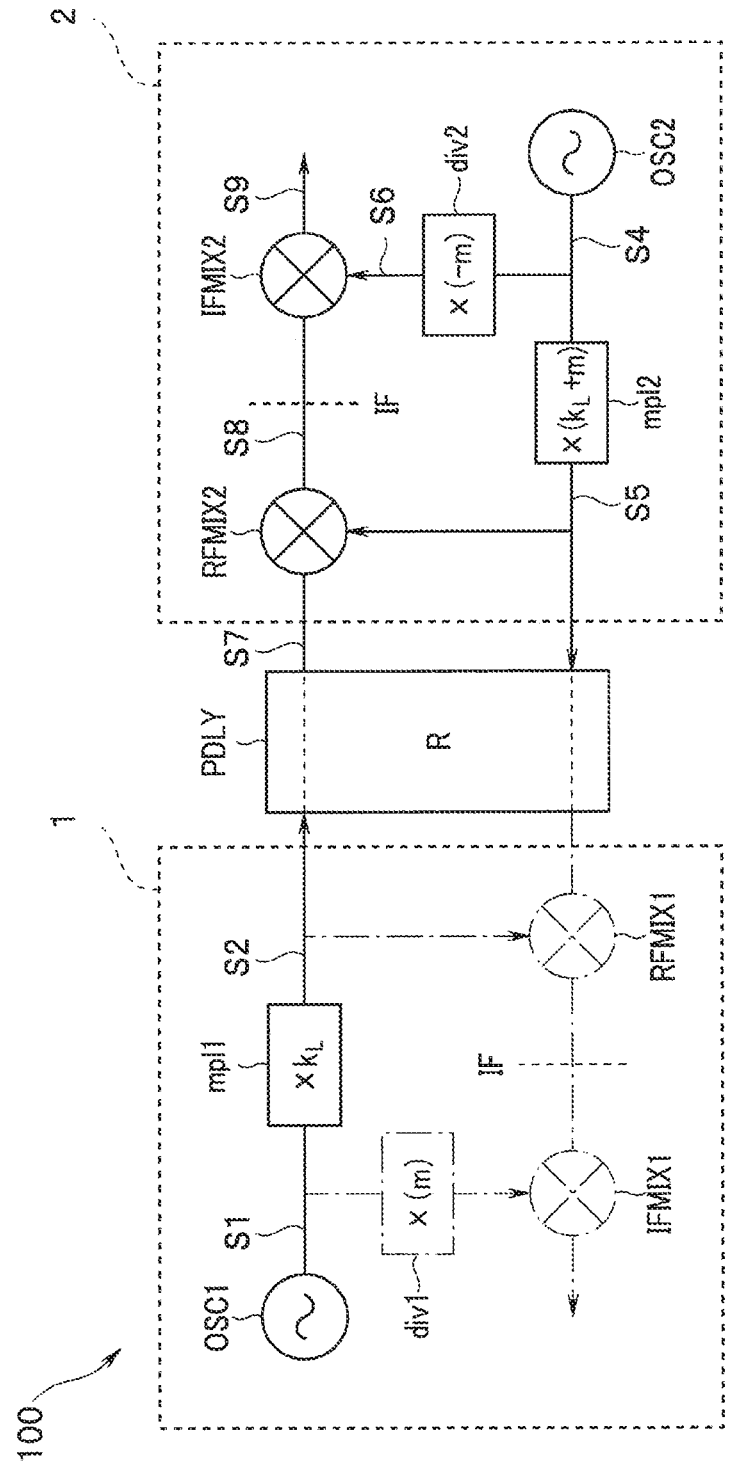
FIG. 14 is a configuration view of the radio circuits of the distance measurement system corresponding to FIG. 10 which uses a frequency different from a frequency used in the radio circuits shown in FIG. 10 according to the first embodiment.
Figure 15:
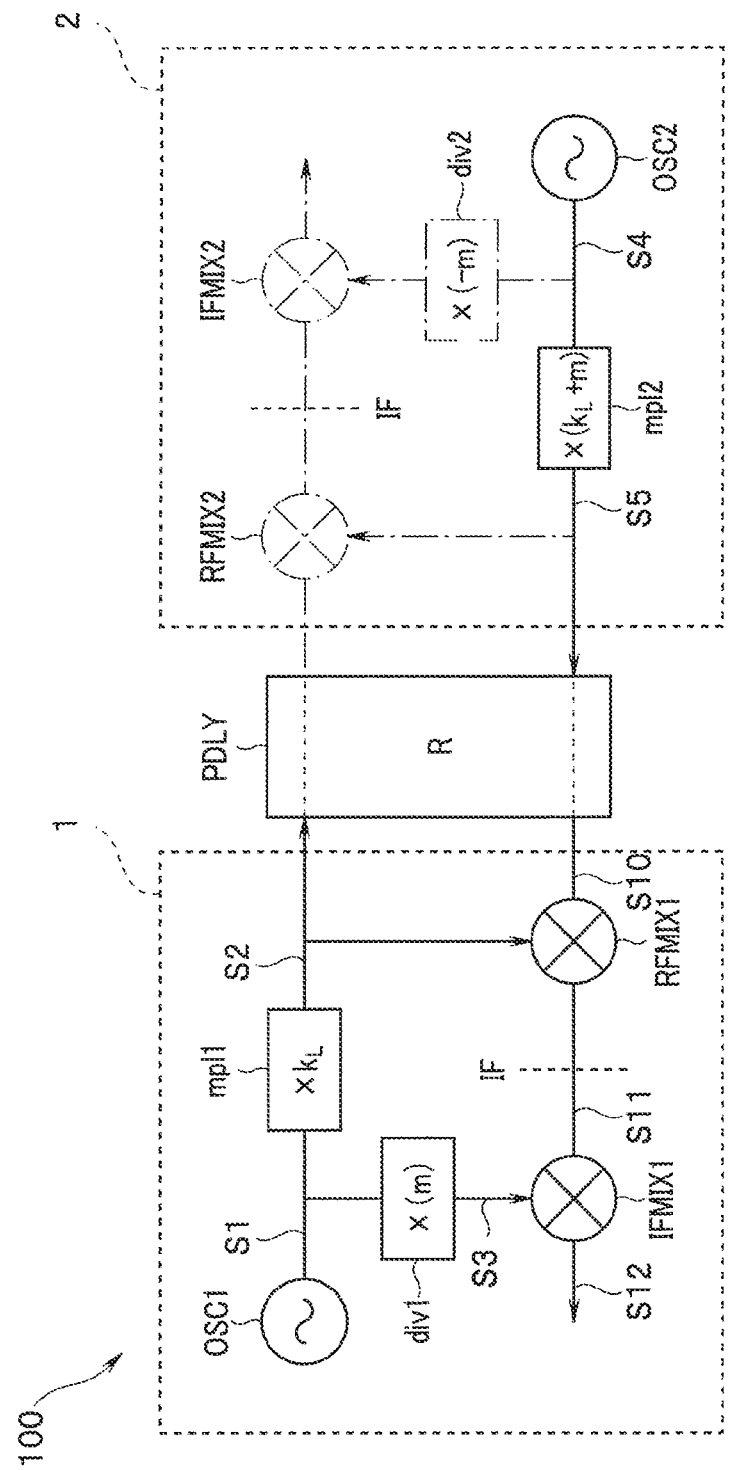
FIG. 15 is a configuration view of the radio circuits of the distance measurement system corresponding to FIG. 11 which uses a frequency different from a frequency used in the radio circuits shown in FIG. 11 according to the first embodiment.

FIG. 14 is a configuration view of the radio circuits of the distance measurement system corresponding to FIG. 10 which uses a frequency different from a frequency used in the radio circuits shown in FIG. 10. FIG. 15 is a configuration view of the radio circuits of the distance measurement system corresponding to FIG. 11 which uses a frequency different from a frequency used in the radio circuits shown in FIG. 11. The phase operation in this distance measurement system is equal to the phase operation performed in transmitting distance measurement signals of frequencies $k_H f_{x1}$, $(k_H+m)f_{x2}$ and hence, a main result obtained by the radio circuits of this distance measurement system is described. In FIG. 14, a distance measurement signal of frequency $k_L f_{x1}$ is transmitted from the device 1, propagates in a space by the distance R, and thereafter, is received by the device 2. A phase of an output signal S9 of the IFMIX2 detected by the device 2 is expressed by a following equation (33).

$$\varphi_{BB2L}(t)=2\pi k_L(f_{x1}-f_{x2})t+(\theta_{Lx1}-\theta_{Lmx2})-\theta_{Bx2}-2\pi k_L f_{x1}\tau_R \quad (33)$$

In the same manner, in FIG. 15, a distance measurement signal of frequency $(k_L+m)f_{x2}$ is transmitted from the device 2, propagates in a space by the distance R, and thereafter, is received by the device 1. A phase of an output signal S12 of the IFMIX1 detected by the device 1 is expressed by a following equation (34).

$$\varphi_{BB1L}(t)=2\pi(k_L+m)(f_{x2}-f_{x1})t+(\theta_{Lmx2}-\theta_{Lx1})-\theta_{Bx1}=2\pi(k_L+m)f_{x2}\tau_R \quad (34)$$

A following relationship is found between frequencies of the signals in the respective devices 1 and 2. When a local oscillation frequency (local frequency) is higher than the signal frequency of a received second carrier signal in the device 1, a local oscillation frequency is lower than the signal frequency of a received first carrier signal in the device 2. On the other hand, when the local oscillation frequency (local frequency) is lower than the signal frequency of the received second carrier signal in the device 1, the local oscillation frequency is higher than the signal frequency of the received first carrier signal in the device 2.

A following equation (35) is obtained by adding the equation (33) and the equation (34) together.

$$\varphi_{BB1L}(t)+\varphi_{BB2L}(t)=-(\theta_{Bx1}+\theta_{Bx2})-2\pi k_L(f_{x1}+f_{x2})\tau_R+ 2\pi m(f_{x2}-f_{x1})t-2\pi m f_{x2}\tau_R \quad (35)$$

A following equation (36) is obtained by calculating a differential between the equation (32) and the equation (35).

$$\varphi_{BB1L}(t)+\varphi_{BB2L}(t)-(\varphi_{BB1H}(t)+\varphi_{BB2H}(t))=2\pi(k_H-k_L)(f_{x1}+f_{x2})\tau_R \quad (36)$$

A left side of the equation (36) expresses phases obtained by the device 1 and the device 2, a right side expresses multiplication of known frequency setting information and a delay time period $\tau_R$ between the device 1 and the device 2, and there are no other unknown variables except for $\tau_R$. Accordingly, the distance R is expressed by a following equation (37) based on the equation $\tau_R=R/c$.

$$R=-\frac{c(\phi_{BB1L}(t)+\phi_{BB2L}(t)-\phi_{BB1H}(t)-\phi_{BB2H}(t))}{2\pi(k_H-k_L)(f_{x1}+f_{x2})} \quad (37)$$

In this embodiment, the operation of the equation (37) is performed in the device 1. More specifically, information on the phase detected by the device 2 is transmitted to the device 1, and the processor 13 of the device 1 forms a calculating unit configured to calculate the distance R based on a phase detection result obtained by receiving first and second carrier signals.

In the denominator of the equation (37), $(k_H-k_L)$ has significance in increasing a detection distance. In other words, in a case where distance measurement is used by performing transmission and reception of a signal by one reciprocation, either $k_H$ or $k_L$ is set in frequency setting. In this case, the denominator becomes $2\pi k_H(f_{x1}+f_{x2})$ or $2\pi k_L(f_{x1}+f_{x2})$. Accordingly, as in the case of this embodiment where a direct VCO modulation is adopted in transmission and an IF configuration is adopted in reception, the accurate distance measurement cannot be performed. Here, a range of a detection is referred. Although $k_H$ and $k_L$ are not equal, $k_H$ and $k_L$ have a relationship of $k_H \approx k_L$. Accordingly, the denominator can be made extremely small and hence, a detection range of the distance R can be largely expanded.

The presence of this distance detection range is attributed to a phase having periodicity of $2\pi$. Further, when frequency is increased, for example, setting of $k_M$ is added, the distance detection based on frequency setting, of $k_L$ and $k_H$, the distance detection based on frequency setting of $k_L$ and $k_M$, and the distance detection based on frequency setting of $k_H$ and $k_M$ are obtained. When the respective distance detections detect the same distance, such a distance becomes a desired distance. The respective distance detections, however, differ from each other in frequency difference and hence, phase results for distance calculation differ from each other. In other words, estimated distances including a turn are calculated based on the respective phase detection results and the distances which agree with each other under three conditions become the desired distance. Accordingly, probability of erroneous distance determination caused by the turn can be largely lowered. As a result, with the use of a large number of frequencies, a range where an accurate distance is calculated is enlarged. Further, with the use of a large number of frequencies, although the detailed description is omitted in this specification, weighting of phase deviation brought about by a multipath can be lowered and hence, accurate distance estimation can be realized.

The equation (11), the equation (31), the equation (33) and the equation (34) are equations in which a time period difference between the respective signals is not taken into consideration and hence, the result of the equation (37) corresponds to the result obtained by transmitting and receiving four waves simultaneously. In FIG. 10, FIG. 11, FIG. 14 and FIG. 15, one transmitting/receiving unit is formed of the device 1 and the device 2. To consider the equation (37) simply, equation (37) requires the configuration where the transmitting/receiving units of the device 1 and the device 2 respectively has two systems.

Accordingly, With the use of two phase information detected by the device 1 and two phase information detected by the device 2, by performing the above-mentioned calculations in the device 1 and the device 2, the distance R between the device 1 and the device 2 can be accurately measured without being affected by respective initial phases. For example, the processor 23 of the device 2 having the key K transmits two detected phase information to the device 1, and calculates the distance between the device 1 and the device 2 based on the above-mentioned equation (37) using two phase information detected by the device 1 and two phase information received from the device 2. In an automobile C having the device 1, after the authentication of the key K is performed, a control of unlocking or the like of a door or processing for prohibiting unlocking of the door can be performed based on information on the calculated distance R.

As described above, according to the above-mentioned embodiment, even in the configuration where a VCO direct modulation method is used in the transmitting unit and an SH method is used in the receiving unit, it is possible to provide the distance measurement device which can realize the accurate distance measurement.

Second Embodiment

In a distance measurement system of this embodiment, a plurality of distance measurement signals are transmitted by a time division method.

This embodiment describes that the distance measurement can be performed on a condition that, in the radio circuits of the device 1 and the device 2 shown in FIG. 10, FIG. 11, FIG. 14 and FIG. 15, the device 1 and the device 2 do not transmit respective distance measurement signals simultaneously. In a case where distance measurement signals are transmitted by a time division method, a phase is rotated by being affected by a frequency error between the device 1 and the device 2 and hence, distance measurement timing affects a distance measurement error. The distance measurement error can be corrected by properly setting distance measurement timing. Note that the configuration of the distance measurement system according to this embodiment is substantially equal to the configuration of the distance measurement system of the first embodiment. Accordingly, the description of the same components is omitted, and only the different components is described.

Figure 16:
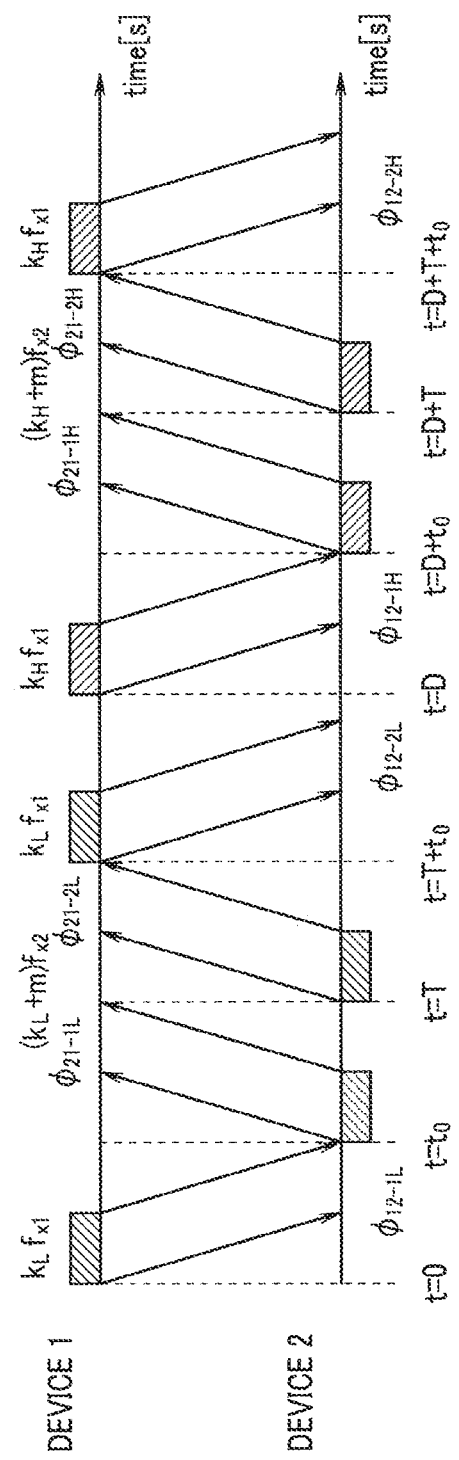
FIG. 16 is a timing chart of a distance measurement signals transmitted and received plural times according to a second embodiment.

FIG. 16 is a timing chart of distance measurement signals transmitted and received plural times. The distance measurement signal transmitted from the device 1 at 0 [s] is received by the device 2. A phase detected by the device 2 is $\varphi_{12-1L}$, and the distance measurement signal transmitted from the device 2 at $t_0$ is received by the device 1. A phase detected by the device 1 is $\varphi_{21-1L}$, and the distance measurement signal transmitted from the device 2 at T is received by the device 1. A phase detected by the device 1 is $\varphi_{21-2L}$, and the distance measurement signal transmitted from the device 1 at (T+$t_0$) is received by the device 2. Assume the phase detected by the device 2 as $\varphi_{12-2L}$. In the above-mentioned distance measurement operation, transmission frequency from the device 1 is $k_L f_{x1}$, and transmission frequency from the device 2 is $(k_L+m)f_{x2}$.

Next, the distance measurement operation is performed in accordance with a similar distance measurement sequence by changing frequencies of distance measurement signals. Transmission frequency from the device 1 is $k_H f_{x1}$, and transmission frequency from the device 2 is $(k_H+m)f_{x2}$. The distance measurement signal transmitted from the device 1 at D [s] is received by the device 2. A phase detected by the device 2 is $\varphi_{12-1H}$, and a distance measurement signal transmitted from the device 2 at (D+$t_0$) is received by the device 1. A phase detected by the device 1 is $\varphi_{21-1H}$, and a distance measurement signal transmitted from the device 2 at (D+T) is received by the device 1. A phase detected by the device 1 is $\varphi_{21-2H}$, and a distance measurement signal transmitted from the device 1 at (D+T+$t_0$) is received by the device 2. Assume a phase detected by the device 2 as $\varphi_{12-2H}$.

Processing is described hereinafter where the plurality of distance measurement signals are transmitted in accordance with the above-mentioned timings, and the distance measurement can be performed based on the detected phases. In other words, the respective transmitting/receiving units of the device 1 and the device 2 transmit and receive two or more first carrier signals and two or more second carrier signals plural times in a divided manner by time division. A carrier signal which is transmitted and received in each time is a single carrier signal.

$\varphi_{12-1L}(t)$ is the phase when the device 1 transmits a distance measurement signal from a time period reference 0 [s] and hence, $\varphi_{12-1L}(t)$ is expressed by the above-mentioned equation (33).

$$\varphi_{12-1L}(t)=2\pi k_L(f_{x1}-f_{x2})t+(\theta_{Lx1}-\theta_{Lmx2})-\theta_{Bx2}-2\pi k_L f_{x1}\tau_R \quad (33)$$

Next, a distance measurement signal is transmitted from the device 2 to the device 1 at a point of time t=$t_0$ [s]. In the device 1 and the device 2, reference signals are independent from each other and hence, a time period of the device 1 is indefinite. The device 2 can, however, substantially know a time period by receiving a distance measurement signal of the device 1. For example, assuming a case where distance measurement is performed within a range up to approximately a distance of 10 [m], a propagation delay of 10 [m] is approximately 33 [ns]. To consider the time period based on a time period at which the device 2 recognizes the reception of the signal, a time difference between the device 1 and the device 2 becomes such a value. Since 33 [μs] is estimated as $t_0$, an error becomes approximately 1/1000. Accordingly, deterioration of distance measurement accuracy can be neglected. In this processing, for the sake of brevity, an analysis is advanced by assuming that a time period reference of the device 2 is equal to a time period reference of the device 1. A phase detected by the device 1 with respect to a distance measurement signal transmitted from the device 2 is expressed by a following equation (38).

$$\varphi_{21-1L}(t+t_0)=2\pi k_L(f_{x2}-f_{x1})(t+t_0)+(\theta_{Lmx2}-\theta_{Lx1})-\theta_{Bx1}-2\pi k_L f_{x2}\tau_R+2\pi m(f_{x2}-f_{x1})(t+t_0)-2\pi m f_{x2}\tau_R \quad (38)$$

Again, a phase detected by the device 1 with respect to a distance measurement signal transmitted from the device 2 at a point of time is expressed by a following equation (39).

$$\varphi_{21-1L}(t+T) = 2\pi k_L(f_{x2}-f_{x1})(t+T) + (\theta_{Lmx2}-\theta_{Lx1}) - \theta_{Bx1} - 2\pi k_L f_{x2}\tau_R + 2\pi m(f_{x2}-f_{x1})(t+T) - 2\pi m f_{x2}\tau_R \quad (39)$$

Next, a phase detected by the device 2 with respect to a distance measurement signal transmitted from the device 1 at a point of time $t=(T+t_0)$ is expressed by a following equation (40).

$$\varphi_{12-2L}(t+T+t_0) = 2\pi k_L(f_{x2}-f_{x1})(t+T+t_0) + (\theta_{Lx1}-\theta_{Lmx2}) - \theta_{Bx2} - 2\pi k_L f_{x1}\tau_R \quad (40)$$

A following equation (41) is obtained by adding the equation (33), the equation (38), the equation (39), and the equation (40) together.

$$\varphi_{12-1L}(t) + \varphi_{21-1L}(t+t_0) + \varphi_{21-2L}(t+T) + \varphi_{12-2L}(t+T+t_0) = -4\pi k_L(f_{x1}+f_{x2})\tau_R - 2(\theta_{Bx1}+\theta_{Bx2}) + 2\pi m(f_{x2}-f_{x1})(2t+t_0+T) - 4\pi m f_{x2}\tau_R \quad (41)$$

With respect to this result, in the same manner as the equation (32), initial phases of the div1 and the div2 are in the second term of the right side, and a term which is a product of IF frequency difference and a time period is the third term of the right side. Accordingly, uncertainty of phases exists.

In the sequence described in FIG. 16, a sequence continues where $k_L$ is reset to $k_H$ and an offset time period D is added. Assuming phases which are detected in order of the device 2, the device 1, the device 1, and the device 2 as $\varphi_{12-1H}(t+D)$, $\varphi_{21-1H}(t+D+t_0)$, $\varphi_{21-2H}(t+D+T)$, $\varphi_{12-2H}(t+D+t_0)$, the detected phases are expressed by the following equations.

$$\varphi_{12-1H}(t+D) = 2\pi k_H(f_{x1}-f_{x2})(t+D) + (\theta_{Hx1}-\theta_{Hmx2}) - \theta_{Bx2} - 2\pi k_H f_{x1}\tau_R \quad (42)$$

$$\varphi_{21-1H}(t+D+t_0) = 2\pi k_H(f_{x2}-f_{x1})(t+D+t_0) + (\theta_{Hmx2}-\theta_{Hx1}) - \theta_{Bx1} - 2\pi k_H f_{x2}\tau_R + 2\pi m(f_{x2}-f_{x1})(t+D+t_0) - 2\pi m f_{x2}\tau_R \quad (43)$$

$$\varphi_{21-2H}(t+D+T) = 2\pi k_H(f_{x2}-f_{x1})(t+D+T) + (\theta_{Hmx2}-\theta_{Hx1}) - \theta_{Bx1} - 2\pi k_H f_{x2}\tau_R + 2\pi m(f_{x2}-f_{x1})(t+D+T) - 2\pi m f_{x2}\tau_R \quad (44)$$

$$\varphi_{12-2H}(t+D+T+t_0) = 2\pi k_H(f_{x1}-f_{x2})(t+D+T+t_0) + (\theta_{Hx1}-\theta_{Hmx2}) - \theta_{Bx2} - 2\pi k_H f_{x1}\tau_R \quad (45)$$

In the same manner as the equation (41), a following equation (46) is obtained by adding the equation (42), the equation (43), the equation (44), and the equation (45) together.

$$\varphi_{12-1H}(t+D) + \varphi_{21-1H}(t+D+t_0) + \varphi_{21-2H}(t+D+T) + \varphi_{12-2H}(t+D+T+t_0) = -4\pi k_H(f_{x1}+f_{x2})\tau_R - 2(\theta_{Bx1}+\theta_{Bx2}) + 2\pi m(f_{x2}-f_{x1})(2t+2D+t_0+T) - 2\pi m f_{x2}\tau_R \quad (46)$$

With respect to this result, in the same manner as the equation (41), initial phases of the div1 and the div2 are in the second term of the right side, and a term which is a product of IF frequency difference and a time period is the third term of the right side. Accordingly, uncertainty of phases exists. The second term of the right side in the equation (41) and the second term of the right side in the equation (46) have the same value and hence, the term becomes 0 by performing subtraction. In the same manner, the fifth term is also cancelled by subtraction. Although a part of the fourth term remains, the reason is described later. The subtraction between the equation (41) and the equation (46) is a manipulation corresponding to the equation (36), and is a manipulation which can enlarge a distance. A following equation (47) is obtained by performing the subtraction.

$$(\varphi_{12-1L}(t) + \varphi_{21-1L}(t+t_0) + \varphi_{21-2L}(t+T) + \varphi_{12-2L}(t+T+t_0)) - (\varphi_{12-1H}(t+D) + \varphi_{21-1H}(t+D+t_0) + \varphi_{21-2H}(t+D+T) + \varphi_{12-2H}(t+D+T+t_0)) = -4\pi(k_H-k_L)(f_{x1}+f_{x2})\tau_R + 2\pi m(f_{x2}-f_{x1})2D \quad (47)$$

The left side is obtained by addition and subtraction of phases which can be detected in accordance with a distance measurement sequence, and the right side includes a component proportional to multiplication result of a frequency set value and a delay time period $\tau_R$ and a product of an inter-device IF frequency difference $m(f_{x2}-f_{x1})$ and a time period interval D of a frequency change. Although the latter becomes a distance error, this distance error can be neglected as described later. Since $\tau_R = R/c$, the distance R is expressed by a following equation (48).

$$R = \frac{\phi_{12-21-L}(t) - \phi_{12-21-H}(t)}{4\pi(k_H-k_L)(f_{x1}+f_{x2})} + \frac{mD(f_{x2}-f_{x1})}{(k_H-k_L)(f_{x1}+f_{x2})} \approx \frac{\phi_{12-21-L}(t) - \phi_{12-21-H}(t)}{4\pi(k_H-k_L)(f_{x1}+f_{x2})} \quad (48)$$

In the equation, $\varphi_{12-21-H}(t)$ and $\varphi_{12-21-L}(t+T+t_0)$ are expressed by following equations (49) and (50) respectively.

$$\varphi_{12-21-H}(t) = \varphi_{12-1H}(t+D) + \varphi_{21-1H}(t+D+t_0) + \varphi_{21-2H}(t+D+T) + \varphi_{12-2H}(t+D+T+t_0) \quad (49)$$

$$\varphi_{12-21-L}(t) = \varphi_{12-1L}(t) + \varphi_{21-1L}(t+t_0) + \varphi_{21-2L}(t+T) + \varphi_{12-2L}(t+T+t_0) \quad (50)$$

In estimating a distance error, for example, assuming an inter-device frequency irregularity as 40 ppm, IF frequency as 200 kHz, a frequency change interval as 10 ms, and a change frequency as 10 MHz, a following equation (51) is established.

$$\frac{mD(f_{x2}-f_{x1})}{(k_H-k_L)(f_{x1}+f_{x2})} < 4 \times 10^{-9} [m] \quad (51)$$

Accordingly, a value of the equation (51) can be neglected. As a result, the distance R can be accurately calculated by an approximation expression of the equation (48). In other words, the approximation expression of the equation (48) means that the distance R is obtained based on the phases detected by the device 1 and the device 2 and frequency setting information. Stated another way, in accordance with eight-time alternating sequence shown in FIG. 16, the phase error due to a frequency difference between the devices included in the phases detected by the device 1 and the device 2 is approximately corrected, and the phase error due to an initial phase difference between the devices included in the phases detected by the device 1 and the device 2 is also approximately corrected. A phase unique to a transmission signal is corrected due to one reciprocation between the devices, a frequency difference between the devices is corrected by two reciprocations, and a demodulation-use unique phase difference between the device 1 and the device 2 is corrected by two reciprocations performed in the same manner while changing a frequency.

With the above-mentioned configuration, according to the first and second embodiments described above, even when the configuration is adopted where a VCO direct modulation method is used in the transmitting unit and an SH method is used in the receiving unit, it is possible to provide a distance measurement device which realizes accurate distance measurement.

Note that frequencies used by the device 1 and the device 2 may be allocated among a plurality of channels.

Figure 17:
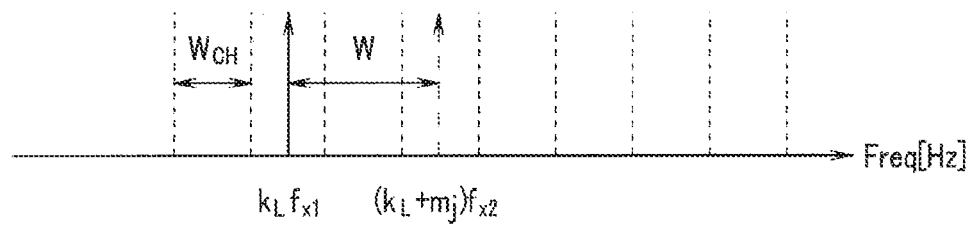
FIG. 17 is a view for describing frequency difference between two distance measurement signals according to a modification of the first and second embodiments.

As described above, in measuring a distance between the device 1 and the device 2, even when a frequency difference between a frequency of a first distance measurement signal transmitted from the device 1 to the device 2 and a frequency of a second distance measurement signal transmitted from the device 2 to the device 1 is set to $mf_{x1}(\approx mf_{x2})$, accurate distance measurement can be performed. In performing the distance measurement within a predetermined frequency band, it is necessary for such distance measurement to conform with Radio Acts of respective countries. In general, a predetermined frequency band has a frequency band defined by a channel number. With respect to the configurations of the radio units of the device 1 and the device 2, when a frequency for transmission is set to a predetermined channel, it is convenient that a channel for reception is determined in accordance with the above-mentioned distance measurement method. In other words, it is preferable that a frequency difference $mf_{x1}(\approx mf_{x2})$ between distance measurement signals of the device 1 and the device 2 be set to a value which is integer multiple of a channel width $W_{CH}$. An image of such setting is shown in FIG. 17. FIG. 17 is a view for describing frequency difference between two distance measurement signals. In FIG. 17, assuming a frequency of a transmission signal from the device 1 as $k_L f_{x1}$, and a frequency of a transmission signal from the device 2 as $(k_L+m_j)f_{x2}$, a frequency difference W between these frequencies is expressed by a following equation (52).

$$W=m_j f_{x2}+k_L(f_{x2}-f_{x1}) \quad (52)$$

This value is set to integer multiple (two here) of the channel width $W_{CH}$. For the sake of brevity, the description is made hereinafter by setting $f_{x2}=f_{x1}$. The equation (52) is expressed by a following equation (53).

$$W=m_j f_{x1} \quad (53)$$

This value is set to integer multiple of $W_{CH}$ and hence, a following equation (54) is established.

$$m_j f_{x1}=j \times W_{CH} \quad (54)$$

In the equation, j is an integer of 1 or more. When j=1, $m_1 f_{x1}=W_{CH}$ is established. In this equation, $m_j$ is defined by a following equation (55).

$$m_j=j \times m_1 \quad (55)$$

By setting frequencies in this manner, the device 1 and the device 2 can perform transmission at center frequencies defined by channels respectively. Accordingly, signals can be set within frequencies defined by an occupied band.

Accordingly, when frequencies of a frequency group of two or more first carrier signals are set as f11, f12, ..., f1N from a lower side, frequencies of a frequency group of two or more second carrier signals are set as f21, f22, ..., f2N from a lower side, and signals of the frequencies f2$i$ (i=1, ..., N) are transmitted from the device 2 in response to transmission of signals of frequencies f1$i$ (i=1, ..., N) from the device 1, assuming $\Delta fCH$ as an inter-channel frequency, frequencies of the respective carrier signals may be set such that a relationship expressed by a following equation (56) is established.

$$|f1i-f2i|=k \times \Delta fCH \quad (56)$$

In the equation, k is an integer.

In using signals in a predetermined frequency band in the above-mentioned distance measurement device, there exists a frequency band which requires a carrier sense before transmitting distance measurement signals in accordance with Radio Acts of respective countries. In the distance measurement device described heretofore, in performing a carrier sense before transmitting distance measurement signals, it is necessary to change frequency setting made by the mpl1 and the mpl2. By changing frequency setting, however, initial phases are changed so that accurate distance measurement cannot be performed. In view of the above, an application example of the distance measurement device which can be used in a band which requires a carrier sense is described. Hereinafter, the configuration of a radio unit and the manner of operation in such an application example are described with reference to FIG. 18.

Figure 18:
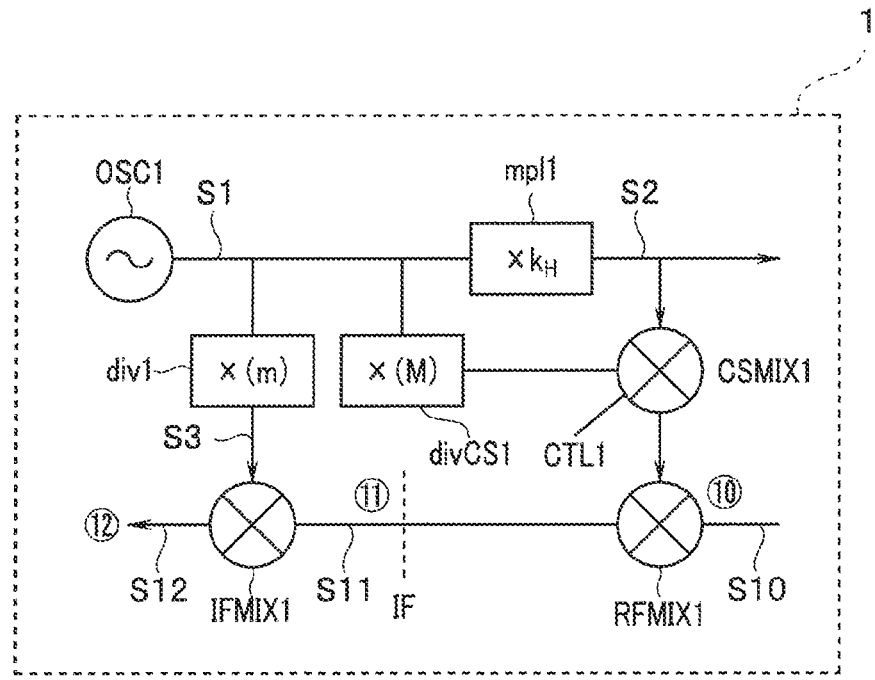
FIG. 18 is a configuration view of a radio circuit in one device according to a modification of the first and second embodiments.

FIG. 18 is a configuration view of a radio circuit in a device 1. Note that although only the device 1 is shown in FIG. 18, the device 2 also has the similar configuration. The difference between the radio circuit shown in FIG. 18 and the radio circuit shown in FIG. 9 lies in that a divCS1 and a CSMIX1 are added, wherein an output signal S1 is inputted to the divCS1 from an OSC1, and the divCS1 outputs an output signal to the CSMIX1. Another input to the CSMIX1 is an output signal S2 of an mpl1, and the CSMIX1 outputs an output signal to an RFMIX1. The CSMIX1 includes a control terminal CTL1, a control signal outputted to the control terminal CTL1 is used for performing a control whether the CSMIX1 is operated by the CTL1 or the CSMIX1 is not operated and substantially an output signal S2 is directly inputted to the RFMIX1. The latter case is the setting which is performed at the time of distance measurement, and the case where the CSMIX1 is operated becomes the case where a carrier sense is performed. A control signal is inputted from a processor 13 to the control terminal CTL1.

In other words, respective transmission circuits of a transmitting/receiving unit of the device 1 and a transmitting/receiving unit of the device 2 have the configuration which directly modulates a voltage-controlled oscillator. The reception circuit of each transmitting/receiving unit has the configuration of a heterodyne method or a Low-IF method which includes an RF mixer (RFMIX), a carrier sense mixer (CSMIX), a carrier-sense use frequency divider (divCS), and an IF mixer (IFMIX). When the distance measurement is performed, an operation of the carrier sense mixer (CSMIX) and an operation of carrier-sense use frequency divider (divCS) are stopped.

A ratio between an input frequency and an output frequency by frequency division performed by the divCS1 is M, and a ratio between an input frequency and an output frequency of the div1 is m. Although these ratios are independently defined, it is sufficient that a following equation (56) is established.

$$M \approx m \quad (56)$$

In the description made hereinafter, for the sake of brevity, M=m is set.

A subject frequency to which a carrier sense is applied is not $(k_H+m)f_{x1}$ but $k_H f_{x1}$. In this case, the divCS1 is operated and hence, output frequency of the CSMIX1 is $(k_H f_{x1}-mf_{x1})$ which is difference frequency between $k_H f_{x1}$ and $mf_{x1}$. Note that an image suppressing mixer is estimated as the CSMIX1, and it is assumed that the CSMIX1 suppresses a sum of frequencies $k_H f_{x1}$ and $mf_{x1}$. When frequency $k_H f_{x1}$ is inputted to the RFMIX1 under such a condition, the output frequency of the RFMIX1 is expressed by a following equation (57).

$$\text{Output freq. of RFMIX1}=k_H f_{x1}-(k_H f_{x1}-mf_{x1})=mf_{x1} \quad (57)$$

Next, the output frequency of the RFMIX1 is multiplied by frequency $mf_{x1}$ by the IFMIX1, an output signal S12 becomes a DC signal, and a signal of frequency $k_H f_{x1}$ inputted to the RFMIX1 is demodulated. Note that it is unnecessary for the carrier sense to satisfy conditions for distance measurement and hence, an output phase of the divCS1 may be set to any phase. When a distance measurement signal is transmitted after the carrier sense is performed, however, continuity of a phase with a preceding distance measurement sequence is necessary and hence, it is necessary to hold an initial phase before the carrier sense is performed. In this case, the initial phase can be held when the mpl1 and the div1 are continuously operated, and an output signal S2 is directly inputted to the RFMIX1 by the CTL1 and hence, the initial phase can be held also with respect to output signals S11 and SI2.

Figure 19:
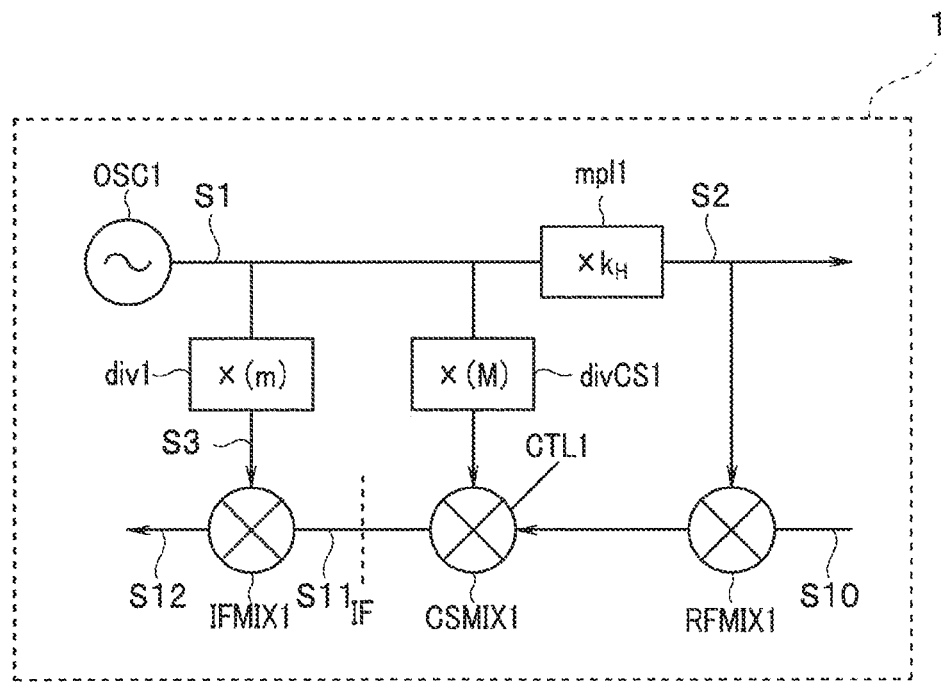
FIG. 19 is a view showing a modification of the radio circuits shown in FIG. 18.

With respect to the distance measurement device which can perform a carrier sense, a distance measurement device which is a modification of the distance measurement device shown in FIG. 18 is shown in FIG. 19. FIG. 19 is a view showing the modification of the distance measurement device shown in FIG. 18. Although additional circuit blocks which are added to the configuration shown in FIG. 9 are similar to the additional circuit blocks shown in FIG. 18, the distance measurement device shown in FIG. 19 differs from the distance measurement device shown in FIG. 18 with respect to connection of circuit blocks. An output of a divCS1 which divides frequency of an output signal is inputted to a CSMIX1. The CSMIX1 is interposed between a RFMIX1 and an IFMIX1. A control of a CTL1 is equal to the corresponding control described with reference to the example shown in FIG. 18. When a carrier sense is performed, the CSMIX1 multiplies an output of a RFMIX1 and an output of a divCS1 with each other, and performs frequency conversion of the output of the RFMIX1. When the carrier sense is not performed, an output of the RFMIX1 is inputted to an IFMIX1 by bypassing the CSMIX1. As a technique for bypassing the CSMIX1, for example, an input of the divCS1 is interrupted and "1" generated in the device may be inputted. Although it is sufficient that a ratio M between input frequency and output frequency of the divCS1 satisfies the condition expressed in the equation (56), for the sake of brevity, the description is made by setting M=m.

A subject frequency to which a carrier sense is applied is not $(k_H+m)f_{x1}$ but $k_H f_{x1}$. An output signal S2 of this frequency is inputted to the RFMIX1. On the other hand, the frequency of the output signal S2 is also $k_H f_{x1}$. Accordingly, an output signal of the RFMIX1 is a DC signal which is difference frequency between $k_H f_{x1}$ and $k_H f_{x1}$. Note that, in this modification, the RFMIX1 uses a quadrature demodulator configured to output an ICH signal and a QCH signal. The CSMIX1 multiplies the ICH signal and an I local signal of frequency $mf_{x1}$ generated by the divCS1 and the QCH signal and a Q local signal of frequency $mf_{x1}$ generated by the divCS1, and adds the two products.

Next, the signal is multiplied by frequency $mf_{x1}$ by the IFMIX1, the output signal S12 becomes a DC signal, and a signal of frequency $k_H f_{x1}$ inputted to the RFMIX1 is demodulated. Note that it is unnecessary for the carrier sense to satisfy conditions for distance measurement and hence, an output phase of the divCS1 may be set to any phase. When a distance measurement signal is transmitted after the carrier sense is performed, however, continuity of a phase with a preceding distance measurement sequence is necessary and hence, it is necessary to hold an initial phase before the carrier sense is performed. In this case, the initial phase can be held when the mpl1 and the div1 are continuously operated, and an output signal S2 is directly inputted to the RFMIX1 by the CTL1 and hence, the initial phase can be held also with respect to output signals S11 and S12.

As has been described heretofore, according to the above-mentioned respective embodiments and the respective modifications, even when the configuration is adopted where a VCO direct modulation method is used in the transmitting unit and an SH method is used in the receiving unit, it is possible to provide a distance measurement device and a distance measurement method which realizes the accurate distance measurement.

While certain embodiments have been described, these embodiments have been presented by way of example only, and are not intended to limit the scope of the inventions. Indeed, the novel methods and devices described herein may be embodied in a variety of other forms; furthermore, various omissions, substitutions and changes in the form of the methods and devices described herein may be made without departing from the spirit of the inventions. The accompanying claims and their equivalents are intended to cover such forms or modifications as would fall within the scope and spirit of the inventions.

What is claimed is:

1. A distance measurement device which calculates a distance based on carrier phase detection, the distance measurement device comprising a calculating unit configured to calculate a distance between a first device and a second device, at least one of the first device and the second device being moveable based on phase information acquired from the first device and the second device, wherein
the first device includes:
a first reference signal source; and
a first transmitting/receiving unit configured to transmit two or more first carrier signals and receive two or more second carrier signals using an output of the first reference signal source,
the second device includes:
a second reference signal source configured to be operated independently from the first reference signal source; and
a second transmitting/receiving unit configured to transmit the two or more second carrier signals and receive the two or more first carrier signals using an output of the second reference signal source,
a frequency group of the two or more first carrier signals and a frequency group of the two or more second carrier signals differ from each other,
the calculating unit calculates the distance based on a phase detection result obtained by receiving the first and second carrier signals,
the first and second reference signal sources are continuously operated during a period in which the two or more first carrier signals and the two or more second carrier signals are transmitted and received by the first and second transmitting/receiving units, and
wherein when frequencies of the frequency group of the two or more first carrier signals are set to f11, f12, f1N from a lower side, frequencies of the frequency group of the two or more second carrier signals are set to f21, f22, f2N from a lower side, and signals of the frequencies f2$i$ ($i$=1, N) are transmitted from the second device in response to transmission of signals of frequencies f1$i$ ($i$=1, N) from the first device, assuming ΔfCH as an inter-channel frequency, frequencies of the respective carrier signals are set such that a relationship expressed by a following equation is established: $|f1i-f2i| = k \times \Delta fCH$ (k=integer).

2. The distance measurement device according to claim 1, wherein
the first transmitting/receiving unit has a first phase detector configured to detect respective phases of the two or more second carrier signals, and
the second transmitting/receiving unit has a second phase detector configured to detect respective phases of the two or more first carrier signals.

3. The distance measurement device according to claim 1, wherein a transmitting unit of each of the first transmitting/receiving unit and the second transmitting/receiving unit is configured to directly modulate an output signal of a voltage-controlled oscillator, and a receiving unit of each of the first and the second transmitting/receiving units has a configuration of a heterodyne method or a Low-Intermediate Frequency ("IF") method.

4. A distance measurement device which calculates a distance based on carrier phase detection, the distance measurement device comprising a calculating unit configured to calculate a distance between a first device and a second device, at least one of the first device and the second device being moveable based on phase information acquired from the first device and the second device, wherein
the first device includes:
a first reference signal source; and
a first transmitting/receiving unit configured to transmit two or more first carrier signals and receive two or more second carrier signals using an output of the first reference signal source,
the second device includes:
a second reference signal source configured to be operated independently from the first reference signal source; and
a second transmitting/receiving unit configured to transmit the two or more second carrier signals and receive the two or more first carrier signals using an output of the second reference signal source, a frequency group of the two or more first carrier signals and
a frequency group of the two or more second carrier signals differ from each other,
the calculating unit calculates the distance based on a phase detection result obtained by receiving the first and second carrier signals, and
the first and second reference signal sources are continuously operated during a period in which the two or more first carrier signals and the two or more second carrier signals are transmitted and received by the first and second transmitting/receiving units, wherein
when a local oscillation frequency of the first reference signal source is higher than a signal frequency of the received second carrier signal in the first device, a local oscillation frequency of the second reference signal source is lower than a signal frequency of the received first carrier signal in the second device, and
when a local oscillation frequency of the first reference signal source is lower than a signal frequency of the received second carrier signal in the first device, a local oscillation frequency of the second reference signal source is higher than a signal frequency of the received first carrier signal in the second device.

5. A distance measurement device which calculates a distance based on carrier phase detection, the distance measurement device comprising a calculating unit configured to calculate a distance between a first device and a second device, at least one of the first device and the second device being moveable based on phase information acquired from the first device and the second device, wherein
the first device includes:
a first reference signal source; and
a first transmitting/receiving unit configured to transmit two or more first carrier signals and receive two or more second carrier signals using an output of the first reference signal source,
the second device includes:
a second reference signal source configured to be operated independently from the first reference signal source; and
a second transmitting/receiving unit configured to transmit the two or more second carrier signals and receive the two or more first carrier signals using an output of the second reference signal source,
a frequency group of the two or more first carrier signals and a frequency group of the two or more second carrier signals differ from each other,
the calculating unit calculates the distance based on a phase detection result obtained by receiving the first and second carrier signals, and
the first and second reference signal sources are continuously operated during a period in which the two or more first carrier signals and the two or more second carrier signals are transmitted and received by the first and second transmitting/receiving units, wherein
a transmission circuit of each of the first transmitting/receiving unit and the second transmitting/receiving unit is configured to directly modulate a voltage-controlled oscillator, and
a reception circuit of each of the first transmitting/receiving unit and the second transmitting/receiving unit has a configuration of a heterodyne method or a Low-Intermediate Frequency ("IF") method, the reception circuit including an RF mixer, a carrier sense mixer, a carrier-sense use frequency divider, and an IF mixer, and
an operation of the carrier sense mixer and an operation of the carrier-sense use frequency divider are stopped when distance measurement is performed.

* * * * *